United States Patent
Paulsen et al.

(10) Patent No.: US 11,462,735 B2
(45) Date of Patent: Oct. 4, 2022

(54) IMPURITY CONTAINING CATHODE MATERIAL WITH PREFERRED MORPHOLOGY AND METHOD TO PREPARE FROM IMPURITY CONTAINING METAL CARBONATE

(71) Applicants: Umicore, Brussels (BE); Umicore Korea Ltd., Chungnam (KR)

(72) Inventors: Jens Paulsen, Daejeon (KR); Heonpyo Hong, BaekSeokDong (KR); JinDoo Oh, Cheonan (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 435 days.

(21) Appl. No.: 16/521,846

(22) Filed: Jul. 25, 2019

(65) Prior Publication Data
US 2019/0386303 A1   Dec. 19, 2019

Related U.S. Application Data

(62) Division of application No. 15/517,273, filed as application No. PCT/IB2015/057492 on Sep. 30, 2015, now Pat. No. 10,411,258.

(30) Foreign Application Priority Data

Oct. 8, 2014  (EP) ...................................... 14188045

(51) Int. Cl.
- *H01M 4/505* (2010.01)
- *C01G 53/00* (2006.01)

(Continued)

(52) U.S. Cl.
CPC .......... *H01M 4/505* (2013.01); *C01G 53/006* (2013.01); *C01G 53/06* (2013.01); *C01G 53/50* (2013.01);

(Continued)

(58) Field of Classification Search
CPC ...................................................... C01G 53/06
See application file for complete search history.

(56) References Cited

U.S. PATENT DOCUMENTS 7,767,189 B2   8/2010   Liu et al.
7,879,266 B2   2/2011   Nakaoka
(Continued)

FOREIGN PATENT DOCUMENTS

CN   1708867 A   12/2005
CN   100593253 A   12/2005
(Continued)

OTHER PUBLICATIONS

EPO, Supplementary European Search Report for European Patent Application No. 15849645, dated Mar. 26, 2018.
(Continued)

*Primary Examiner* — Peter F Godenschwager
(74) *Attorney, Agent, or Firm* — NK Patent Law

(57) ABSTRACT

A carbonate precursor compound for manufacturing a lithium metal (M)-oxide powder usable as an active positive electrode material in lithium-ion batteries, M comprising 20 to 90 mol % Ni, 10 to 70 mol % Mn and 10 to 40 mol % Co, the precursor further comprising a sodium and sulfur impurity, wherein the sodium to sulfur molar ratio (Na/S) is 0.4<Na/S<2. Thes lithium metal (M)-oxide powder has a particle size distribution with 10 µm≤D50≤20 µm, a specific surface with 0.9≤BET≤5, the BET being expressed in g/cm², the powder further comprises a sodium and sulfur impurity, wherein the sum $(2*Na_{wt})+S_{wt}$ of the sodium ($Na_{wt}$) and sulfur ($S_{wt}$) content expressed in wt % is more than 0.4 wt % and less than 1.6 wt %, and wherein the sodium to sulfur molar ratio (Na/S) is 0.4<Na/S<2.

13 Claims, 14 Drawing Sheets

(51) Int. Cl.
*C01G 53/06* (2006.01)
*H01M 4/525* (2010.01)
*H01M 10/0525* (2010.01)
*H01M 4/02* (2006.01)

(52) U.S. Cl.
CPC ....... *H01M 4/525* (2013.01); *H01M 10/0525* (2013.01); *C01P 2002/50* (2013.01); *C01P 2002/72* (2013.01); *C01P 2004/03* (2013.01); *C01P 2004/51* (2013.01); *C01P 2006/11* (2013.01); *C01P 2006/12* (2013.01); *C01P 2006/40* (2013.01); *C01P 2006/80* (2013.01); *H01M 2004/028* (2013.01)

(56) References Cited

U.S. PATENT DOCUMENTS

| | | |
|---|---|---|
| 7,897,069 B2 | 3/2011 | Nakaoka |
| 3,066,915 A1 | 11/2011 | Nakaoka |
| 9,825,337 B2 | 11/2017 | Watanabe et al. |
| 2003/0044684 A1 | 3/2003 | Nanamoto et al. |
| 2006/0068289 A1 | 3/2006 | Paulsen et al. |
| 2006/0105239 A1 | 5/2006 | Paulsen et al. |
| 2006/0121350 A1 | 6/2006 | Kajiya et al. |
| 2011/0193013 A1 | 8/2011 | Paulsen et al. |
| 2012/0217435 A1 | 8/2012 | Yamamoto |
| 2013/0032753 A1 | 2/2013 | Yamamoto et al. |
| 2014/0034872 A1 | 2/2014 | Watanabe et al. |
| 2014/0234203 A1 | 8/2014 | Park et al. |
| 2014/0308584 A1 | 10/2014 | Endo |

FOREIGN PATENT DOCUMENTS

| | | |
|---|---|---|
| CN | 101229928 | 7/2008 |
| CN | 100413125 A | 8/2008 |
| CN | 102770990 A | 11/2012 |
| EP | 2541653 A1 | 1/2013 |
| JP | H09245787 A | 9/1997 |
| JP | 2001273898 A | 10/2001 |
| JP | 2004292264 A | 10/2004 |
| JP | 2006503789 A | 2/2006 |
| JP | 2011096650 A | 5/2011 |
| JP | 2011198759 A | 10/2011 |
| JP | 2014503451 A1 | 2/2014 |
| WO | 2006033525 A1 | 3/2006 |
| WO | 2004064180 A1 | 5/2006 |
| WO | 2010015368 A1 | 2/2010 |
| WO | 2012020768 A1 | 2/2012 |
| WO | 2012070012 A1 | 5/2012 |
| WO | 2013069454 A1 | 5/2013 |

OTHER PUBLICATIONS

EPO; European Search Report for European Patent Application No. 14188045, dated Mar. 26, 2015.
Wang, D., et al., "Growth Mechanism of Ni0.3Mn0.7CO3 Precursor for High Capacity Li-Ion Battery Cathods", J. Mater. Chem., Jan. 1, 2011, vol. 21, pp. 9290-9295.
ISA/KR; International Search Report and Written Opinion for International Patent Application No. PCT/IB2015/057492, dated Jan. 20, 2016, 12 pages.

IMPURITY CONTAINING CATHODE MATERIAL WITH PREFERRED MORPHOLOGY AND METHOD TO PREPARE FROM IMPURITY CONTAINING METAL CARBONATE

CROSS-REFERENCE TO RELATED APPLICATION

This application is a divisional of U.S. patent application Ser. No. 15/517,273, filed on Apr. 6, 2017, which is a National Stage application of International Patent Application No. PCT/IB2015/057492, filed on Sep. 30, 2015, which claims the benefit of European Patent Application No. 14188045.0, filed on Oct. 8, 2014.

TECHNICAL FIELD AND BACKGROUND

This invention relates to a precursor for cathode materials for rechargeable lithium batteries and a process to produce these precursors. The cathode materials are so-called NMC cathode materials, where NMC stands for nickel-manganese-cobalt. More particularly, this invention focuses on supplying precursors for NMC cathode materials with the aim that the final NMC cathode materials have a large surface area and therefore are particularly suitable for power demanding applications like batteries for hybrid electric vehicles.

NMC cathode materials are generally prepared by solid state reactions, wherein a source of lithium—for example $Li_2CO_3$—is blended with a Ni—Mn—Co containing precursor, and the mixture is fired in an oxygen containing atmosphere—for example air—to yield the final lithium transition metal oxide powder. Generally NMC has roughly the stoichiometry $LiMO_2$, where M is a transition metal mostly consisting of Ni, Mn and Co. The crystal structure is an ordered rocksalt structure where the cations order into 2-dimensional Li and M layers. The spacegroup is R-3M. There are many different possible compositions, often categorized and named after their nickel, manganese and cobalt content. Typical NMC based materials are "111" where $M=Ni_{1/3}Mn_{1/3}Co_{1/3}$, "552" with $M=Ni_{0.423}Mn_{0.423}Co_{0.167}$, "532" with $M=Ni_{0.5}Mn_{0.3}Co_{0.2}$, "622" with $M=Ni_{0.6}Mn_{0.2}Co_{0.2}$, "261" with $M=Ni_{0.222}Mn_{0.667}Co_{0.111}$, etc. In the current document, for simplicity, we will often refer to the metal composition by using the numbers, for example we will refer to $M=Ni_{0.423}Mn_{0.423}Co_{0.167}$ as M=NMC 552.

Additional doping is possible, typical elements include Al, Mg etc. Generally, the Li to M stoichiometric ratio is near to—but often not exactly—unity. If Li:M increases Li replaces M on M-layer sites and the structure can—in a simplified manner—be written as $Li_1[M_{1-x}Li_x]O_2$ or $Li_{1+x}M_{1-x}O_2$, where Li:M=(1+x)/(1−x). Typical Li:M is about 1.10 for "111" and "442", and 1.02 for "622". One effect of increasing the Li:M stoichiometric ratio is that the cation mixing is changed. With cation mixing we mean that the real crystal structure is not exactly $LiMO_2$ or $Li_1[M_{1-x}Li_x]O_2$ but rather $\{Li_{1-x}M_x\}[M_{1-y}Li_y]O_2$, where "x" refers to the M atoms on Li-layer sites, which thus undergo "cation mixing".

NMC is a "mixed metal" cathode material, and it is known that NMC cannot be prepared from "non-mixed" precursors. The use of non-mixed precursors—for example $NiO+Mn_2CO_3+Co_3O_4$—generally results in a poor performance electrode material. In order that the cathode works well in the battery, within the $Li-M-O_2$ crystal structure, the Ni, Mn, Co cations need to be well mixed at atomic scale. In the standard process, this is achieved by using mixed transition metal precursors, where the transition metal atoms are well mixed at nanometer scale. For NMC cathode preparation, usually a mixed metal hydroxide $M(OH)_2$, or its oxidized form MOOH, is used as precursor. Mixed hydroxide precursors are usually prepared by a precipitation process. A process, which is widely used industrially, comprises a step where a flow of (a) a metal sulfate solution, (b) a NaOH solution and (c) a $NH_4OH$ solution are fed into a reactor. The resulting hydroxide contains sulfur, but is practically free of sodium. Most of the sulfur remains during the firing of the precursor and hence the final commercial NMC cathode contains sulfur. The standard precipitation process to prepare mixed hydroxide precursors involves the use of ammonia. The ammonia is a so-called chelating agent. The Ni-ammonia complexes increase the metal solubility and thus decrease the nucleation rate during precipitation. Without ammonia, for example, it would be difficult to prepare a sufficiently dense hydroxide, especially if large particles having sizes >10 μm are desired. Without ammonia, it is practically impossible to stabilize transition metal hydroxide precipitation conditions in a way, which yields large particles having the preferred spherical morphology. The ammonia that is present in a precipitation process always creates a certain safety risk. In the case of an accident, hazardous fumes evolve, so it would—from a safety point of view—be highly desirable to develop an ammonia free precipitation process. After precipitation, the ammonia remains in the filter solution. As the ammonia cannot be released to the environment, the waste water is treated to remove—preferably to recycle—the ammonia. These ammonia installations are expensive and increase the capital investment significantly, as well as the operating cost for the waste treatment, in particular by the higher need of energy. It would therefore be desired to develop an ammonia free precipitation method, which supplies mixed precursor having a sufficient density and spherical morphology, for reasons described below.

The use of a mixed metal carbonate as precursor for NMC has been reported also, but—to our knowledge—is not yet used industrially. The preparation of mixed metal carbonate precursors for lithium transition metal oxide cathode materials is known since a long time. For example, U.S. Pat. No. 7,879,266 discloses a mixed metal carbonate precursor having a particle size between 20 and 40 μm and a Brunauer-Emmett-Teller (BET) surface area between 50 and 130 $m^2/g$. The tap density is above 1.7 $g/cm^3$. The preparation is a co-precipitation of a dissolved transition metal salt with a carbonate or bicarbonate solution. The precipitation occurs at a $CO_3/M$ ratio of 2-10, preferably 3-8. U.S. Pat. No. 7,897,069 discloses a mixed metal carbonate precursor to prepare NMC. The particle size is 5-20 μm and the BET (Brunauer-Emmett-Teller) surface area is 40-80 $m^2/g$. The tap density is above 1.7 $g/cm^3$. The preparation is a co-precipitation of a dissolved transition metal salt with a carbonate or bicarbonate solution. The precipitation occurs at a $CO_3/M$ ratio of 2-7, preferably 3-6. The method of the patent uses an excess of carbonate ($CO_3$) in the reaction solution and enables to achieve a composite carbonate with a high yield. However, if excess $Na_2CO_3$ is used the resulting carbonate has a high Na impurity and $LiMO_2$ cathodes prepared from $CO_3$ excess precursors show a poor performance. Other carbonate process patents are CN101229928 B, describing a carbonate precipitation process which includes ammonia, and U.S. Pat. No. 8,066,915 describes the corresponding process. U.S. Pat. No. 7,767,189 describes a process to prepare NMC which quite generally includes the precipitation of mixed metal carbonate. In the carbonate precipitation reaction, $Na_2CO_3$ is used, which is less corrosive than NaOH, and the pH during a carbonate precipitation is lower, that means less corrosive than that of a hydroxide precipitation. As a result, a carbonate process could more easily be implemented at mass production scale.

Other alternative precipitation methods include the bi-carbonate precipitation. It is relatively easy to achieve a mixed carbonate precursor with desired properties like spherical morphology, good density etc. by the following bicarbonate process reaction:

$$2NaHCO_3 + MSO_4 \rightarrow Na_2SO_4 + MCO_3 + H_2CO_3. \quad (1)$$

The disadvantage of this process is the low efficiency. To precipitate 1 kg of $MCO_3$ typically about 1.5 kg of sodium bicarbonate is needed whereas a carbonate process

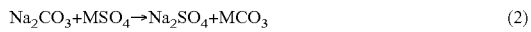

$$Na_2CO_3 + MSO_4 \rightarrow Na_2SO_4 + MCO_3 \quad (2)$$

requires much less, only about 900 g of carbonate. Additionally, the solubility of bicarbonate is much lower (about 200 g/L at 90° C.) than the solubility of sodium carbonate (about 400 g/L). That means that—compared with carbonate precipitation—the maximum yield of the bicarbonate process per liter of solution is 3 times lower, and this significantly increases the cost of filtering and wastewater treatment, rendering the bicarbonate process not fully competitive.

Compared to a carbonate precipitation a bi-carbonate precipitation happens at lower pH in the presence of a high concentration of carbonate. The lower pH tends to suppress Na insertion and the excess $CO_3$ tends to suppress sulfur insertion into the mixed transition metal carbonate crystal structure. As a result, bicarbonate can allow to precipitate relatively poor transition metal carbonate.

It is generally desired to obtain pure $MCO_3$ precursors for $LiMO_2$ cathode preparation. A high impurity content tends to reduce the reversible capacity of the $LiMO_2$ cathode due to the presence of the electrochemically "inert" second phase. So there tends to be consensus that sulfur is not desired, and especially a sodium impurity is harmful. The authors of the current patent application carefully investigated if impurities can be tolerated or even desired, and if yes, in what concentrations and mol ratios should impurities, especially sulfur and sodium, be present.

For automotive applications like Hybrid Electric Vehicles (HEV) high power batteries are needed. The cathode materials need to be able to support these high power rates. A major rate performance limitation is the solid state diffusion rate of lithium within a single particle. Generally the typical time for diffusion can be reduced—and thus a higher power can be achieved—if the solid state diffusion length decreases. The diffusion length can be decreased by reducing the particle size, but there are limitations since small particles have a low density. Such a low density is not desired because it causes problems during electrode coating, and the volumetric energy density of the final battery is low. Much more preferred are relatively large, spherical and relatively dense particles which have an open, interconnected porosity. In the present document we refer to a NMC cathode powder having large spherical, relative dense particles, but at the same time an interconnected meso or nano porosity as "NMC with preferred morphology". The open, interconnected porosity contributes to the surface so "NMC with preferred morphology" has a much higher BET surface area than expected from dense particles having the same shape. So the BET surface area of commercial NMC consisting of dense particles is typically in the order of 0.2 to 0.4 $m^2/g$. The NMC with preferred morphology typically may have a BET surface area in the range of 1 $m^2/g$ or higher. In the battery, the pores of NMC with preferred morphology will be filled with electrolyte, which acts as a diffusion highway into the particle because liquid diffusion is much faster than the diffusion in solid particles. Obtaining powders where the particles have this preferred morphology remains however a challenge. The present invention aims at providing NMC cathode materials and carbonate based precursors for those NMC cathode materials, the NMC cathode material being particularly suitable for use in automotive applications.

SUMMARY

Viewed from a first aspect, the invention can provide a carbonate precursor compound for manufacturing a lithium metal (M)-oxide powder usable as an active positive electrode material in lithium-ion batteries, M comprising 20 to 90 mol % Ni, 10 to 70 mol % Mn and 10 to 40 mol % Co, the precursor further comprising a sodium and sulfur impurity, wherein the sodium to sulfur molar ratio (Na/S) is $0.4 < Na/S < 2$. In one embodiment, the carbonate precursor may have the general formula $MCO_3$, wherein $M = Ni_xMn_yCo_zA_v$, A being a dopant, wherein $0.20 \leq x \leq 0.90$, $0.10 \leq y \leq 0.67$, and $0.10 \leq z \leq 0.40$, $v \leq 0.05$, and $x+y+z+v=1$. In another embodiment, the carbonate precursor compound may have the general formula $MCO_3$, wherein $M = Ni_xMn_yCo_zA_v$, A being a dopant, wherein $0.30 \leq x \leq 0.60$, $0.20 \leq y \leq 0.50$, and $0.10 \leq z \leq 0.40$, $v \leq 0.05$, and $x+y+z+v=1$. In one sub-embodiment $v=0$. In still another embodiment, the carbonate precursor compound may have the general formula $MCO_3$, wherein $M = Ni_xMn_yCo_zA_v$, A being a dopant, wherein $0.10 \leq x < 0.30$, $0.55 \leq y \leq 0.80$, and $0 < z \leq 0.30$, $v \leq 0.05$, and $x+y+z+v=1$. In one sub-embodiment $v=0$. In several embodiments, the dopant A may be either one or more of Mg, Al, Ti, Zr, Ca, Ce, Cr, Nb, Sn, Zn and B.

For the carbonate precursor compound of the invention, the sum $(2*Na_{wt})+S_{wt}$ of the sodium $(Na_{wt})$ and sulfur $(S_{wt})$ content expressed in wt % may be more than 0.4 wt % and less than 1.6 wt %. In this embodiment, the sodium content may be between 0.1 and 0.7 wt %, and the sulfur content between 0.2 and 0.9 wt %. Also in this embodiment, the sodium content may be between 0.15 and 0.30 wt %, and the sulfur content between 0.20 and 0.45 wt %. The carbonate precursor compound may have a particle size distribution with 10 $\mu m \leq D50 \leq 20$ $\mu m$.

The first aspect of the invention is to provide a mixed metal carbonate precursor for NMC cathode materials. After firing, the NMC cathode materials have a preferred morphology. The obtained cathodes have an open porosity and the BET surface area is significantly higher than expected for dense particles of the same size that are not prepared according to the invention. The preferred morphology supports high power, which makes the NMC cathode suitable for automotive applications. The precursor contains sodium and sulfur impurities, the concentration and ratio of these impurities is well designed to achieve an excellent performance. It is clear that further precursor embodiments according to the invention may be provided by combining features that are covered in each of the different precursor embodiments described before.

Viewed from a second aspect, the invention can provide a lithium metal oxide powder for a positive electrode material in a rechargeable battery, having the general formula $Li_{1+a}M_{1-a}O_2$ where $M = Ni_xMn_yCo_zA_v$, A being a dopant, wherein $-0.05 \leq a \leq 0.25$, $0.20 \leq x \leq 0.90$, $0.10 \leq y \leq 0.67$, and $0.10 \leq z \leq 0.40$, $v \leq 0.05$, and $x+y+z+v=1$, the powder having a particle size distribution with 10 μm≤D50≤20 μm, a specific surface with 0.9≤BET≤5, the BET being expressed in $m^2/g$, the powder further comprising a sodium and sulfur impurity, wherein the sum $(2*Na_{wt})+S_{wt}$ of the sodium ($Na_{wt}$) and sulfur ($S_{wt}$) content expressed in wt % is more than 0.4 wt % and less than 1.6 wt %, and wherein the sodium to sulfur molar ratio (Na/S) is 0.4<Na/S<2. In one embodiment, the lithium metal oxide powder comprises a secondary $LiNaSO_4$ phase. In another embodiment, the relative weight of the secondary $LiNaSO_4$ phase is at least 0.5 wt %, as determined by Rietveld analysis of the XRD pattern of the powder. It is preferred that the relative weight is at least 1.5 wt %, or even at least 3.5 wt %. The dopant A may be either one or more of Mg, Al, Ti, Zr, Ca, Ce, Cr, Nb, Sn, Zn and B. In several embodiments: $-0.05 \leq a < 0.10$, $0.30 \leq x \leq 0.60$, $0.20 \leq y \leq 0.50$, and $0.10 \leq z \leq 0.40$, or $0.10 \leq a \leq 0.25$, $0.10 \leq x < 0.30$, $0.55 \leq y \leq 0.80$, and $0 < z \leq 0.30$.

For the lithium metal oxide powder according to the invention it may be that, either:
0.4<Na/S<1, and the powder further comprises $Na_2SO_4$; or
1<Na/S<2, and the powder further comprises $Li_2SO_4$.

The second aspect of the invention is a cathode material prepared from the mixed metal carbonate. The cathode material has a preferred morphology. Particles are generally spherical, have an open porosity and the surface area is significantly larger than that of a cathode material consisting of dense particles of the similar shape. It is clear that further lithium metal oxide powder embodiments according to the invention may be provided by combining features that are covered in each of the different powder embodiments described before.

Viewed from a third aspect, the invention can provide a method for preparing a carbonate precursor compound, comprising the steps of:
providing a feed solution comprising Ni-, Mn- and Co-ions, and a source of A,
providing an ionic solution comprising a carbonate solution and Na-ions,
providing a slurry comprising seeds comprising M'-ions, wherein
M'=$Ni_{x'}Mn_{y'}Co_{z'}A'_{n'}$, A' being a dopant, with $0 \leq x' \leq 1$, $0 \leq y' \leq 1$, $0 \leq z' \leq 1$, $0 \leq n' \leq 1$ and $x'+y'+z'+n'=1$,
mixing the feed solution, the ionic solution and the slurry in the reactor, thereby obtaining a reactive liquid mixture,
precipitating a carbonate onto the seeds in the reactive liquid mixture, thereby obtaining a reacted liquid mixture and the carbonate precursor, and
separating the carbonate precursor from the reacted liquid mixture. In one embodiment, the seeds have a median particle size D50 between 0.1 and 3 μm. In another embodiment, the M'-ions are present in a water insoluble compound that is either one of $M'CO_3$, $M'(OH)_2$, M'-oxide and M'OOH. It may be that the Ni-, Mn-, Co- and A-ions are present in a water soluble sulfate compound. In still another embodiment, the molar ratio ($M'_{seeds}/M_{feed}$) of the metal content in the seed slurry to the metal content in the feed solution is between 0.001 and 0.1, and the median particle size of the carbonate precursor is determined by the ratio $M'_{seeds}/M_{feed}$. In a particular embodiment M=M'.

In different method embodiments, A and A' are either one or more of Mg, Al, Ti, Zr, Ca, Ce, Cr, Nb, Sn, Zn and B. In the method according to the invention, the concentration of $NH_3$ in the reactor may be less than 5.0 g/L, or the reactive liquid mixture may be basically free of $NH_3$. The reactor may be a continuous stirred tank reactor (CSTR). In another embodiment, the ionic solution further comprises either one or both of a hydroxide and a bicarbonate solution, and the ratio $OH/CO_3$, or $OH/HCO_3$, or both these ratios are less than 1/10.

The third aspect of the invention is a cheap process to prepare these mixed carbonate precursors by a continuous precipitation process. Feeds of dissolved $Na_2CO_3$ and metal sulfate are fed to reactor. The base: acid flow rate ratio ($Na_2CO_3:MSO_4$) is controlled to obtain a mixed metal carbonate having a desired Na and S impurity concentration ratio. Growth of particles is not controlled by controlling the flow rate ratio but by addition of seeds to the reactor.

Viewed from a fourth aspect, the invention can provide a method for preparing the lithium metal oxide powder according to the second aspect of the invention, comprising the steps of:
providing a carbonate precursor according to the first aspect of the invention,
providing a Li precursor compound,
mixing the M-carbonate and the Li precursor,
heating the mixture up to 500° C., wherein the temperature increase between 300 and 500° C. is performed in at least 1 hr, and
firing the mixture at a temperature between 600 and 1100° C. for at least 1 hr.

It is clear that further method embodiments according to the invention may be provided by combining features that are covered in each of the different method embodiments described before.

DETAILED DESCRIPTION OF THE INVENTION

Figure 1:
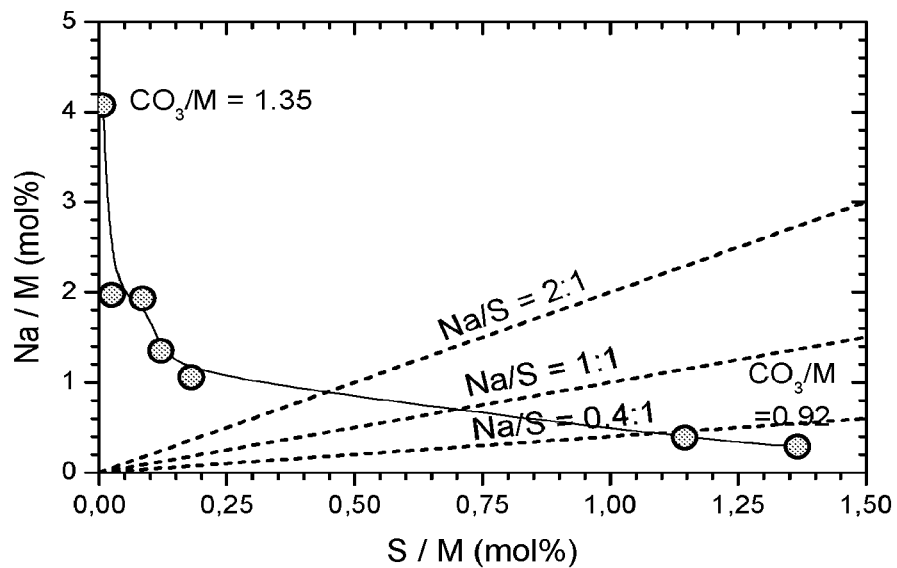
FIG. 1: Impurity map for carbonate precipitations where the $CO_3$/M flow ratio varies from 0.92 to 1.35

Mixed metal carbonate—in principle—could be precipitated by continuously inserting a flow of MSO$_4$ and a flow of Na$_2$SO$_4$ into a stirred reactor. The authors observed that—no matter what conditions are chosen—the precipitation of pure mixed carbonate according to formula (2) above is not possible. Sodium and/or sulfur are always included in the precipitated particles, possibly being present within the crystal structure of the mixed carbonate. A possible reaction formula is

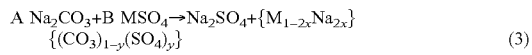

$$A\ Na_2CO_3 + B\ MSO_4 \rightarrow Na_2SO_4 + \{M_{1-2x}Na_{2x}\}\{(CO_3)_{1-y}(SO_4)_y\} \quad (3)$$

In this formula A and B are near to 1, x and y are small numbers, typically less than 0.05. In this formula $2x/(1-2x)=Na/M$, which is the sodium (impurity) content in the precipitate, and $y/(1-2x)=S/M$, which is the sulfur (impurity) content. Finally $2x/y=Na/S$, which is the sodium to sulfur impurity ratio in the precipitate (mol/mol).

The fact that impurities are always present is possibly one reason that generally carbonate precipitation is seen as a process which does not allow to obtain good NMC cathode materials. The authors recognized that a removal of these impurities is not the preferred option, instead of this, excellent cathode properties are achieved if the quantities of these impurities are within certain boundaries.

During firing not only the lithium transition metal cathode is formed, also the sodium and sulfur react. If the sodium to sulfur ratio in the carbonate precursor is larger than 2, sodium is either incorporated into the crystal structure of the lithium transition metal cathode, or it forms an undesired sodium-transition-metal oxide. In both cases, a poor performance of the cathode material is achieved. However, if 1<Na/S<2 then sodium is not incorporated in the crystal structure, and instead Na$_2$SO$_4$ and LiNaSO$_4$ salts are formed. These can be removed by a washing process, however, the authors observed that—surprisingly—the presence of this salt improves the electrochemical performance of the cathode in the final battery. If 0.4<Na/S<1 then sodium is not incorporated into the crystal structure but Li$_2$SO$_4$ and LiNaSO$_4$ forms. These salts can be removed by a washing process, however, the authors observed that the presence of this salt—surprisingly—improves the electrochemical performance of the cathode in the final battery. If the sodium to sulfur ratio is less than 0.4 then typically the sulfur impurity is too high. This reduces the theoretical available capacity too much, since the final Li$_2$SO$_4$ impurity is electrochemically "inert", i.e. it does not contribute to the reversible capacity of the battery. The Li$_2$SO$_4$ can be washed away, however in this case significant amounts of lithium are lost in the wastewater, which increases the cost of the cathode.

Generally the desired Na/S ratio in metal carbonate precursors is between 0.4 and 2, or 0.4<Na/S<2. The final cathode contains a LiNaSO$_4$ secondary phase. If the sodium to sulfur ratio is near to unity then the content of LiNaSO$_4$ is maximized. In this case LiNaSO$_4$ can be detected by XRD diffraction, especially when applying slow scans to achieve high counts. If the sodium to sulfur ratio increases or decreases then—the more it deviates from unity—less LiNaSO$_4$ is present and the detection by XRD becomes difficult; though LiNaSO$_4$ is still present.

Not only the sodium to sulfur impurity ratio is important, also the total impurity content matters. If the total impurity content is too small, the benefit of LiNaSO$_4$ and other sulfate salts is not utilized and the NMC cathode will suffer from poor electrochemical performance, especially the irreversible capacity increases. If the impurity content is too high then too much electrochemically inert sodium salt is present and the reversible capacity decreases due to less simply active material. A preferred region of impurity content is defined by 0.4 wt %<2×Na (wt %)+S (wt %)<1.6 wt %.

The current patent application aims at supplying a precursor which contains both sodium and sulfur, and where the sodium and sulfur contents are optimized in a way that the final NMC cathode may contain crystalline LiNaSO$_4$, that means the sodium impurity is present as soluble salt, and for that reason has an excellent electrochemical performance. LiNaSO$_4$ typically originates from impurities in the carbonate precursor. It might be that a mixed metal carbonate precursors with the right sodium to sulfur ratio is not available but instead of this a carbonate precursor with to large Na: sulfur ration is available. In this special case, the desired sodium to sulfur ratio in the final cathode can still be achieved by adding a source of sulfur. The sulfur is added before firing, for example in the form of Li$_2$SO$_4$. A typical reaction is Li$_2$SO$_4$+Na→LiNaSO$_4$+Li. The Na is extracted from the lithium transition metal oxide and the lithium is inserted into the lithium transition metal oxide crystal structure.

A typical metal hydroxide precipitation is a continuous process approaching a steady state. A continuous flow reactor is used wherein flows of dissolved base (for example NaOH) and dissolved acid (for example MSO$_4$) are continuously fed into the stirred reactor. During the steady state the particle size control is typically achieved by a variation of the flow ratios. Within a narrow range small changes of flow ratio between NaOH (base) and MSO$_4$ (acid) allow to achieve different particle sizes. Mixed metal carbonate is prepared by a co-precipitation reaction. A flow of dissolved Na$_2$CO$_3$ and at least one flow of dissolved metal sulfate are fed into a reactor under strong agitation. The metal flow typically is a mixture of different transition metal sulfates. Alternatively, metal sulfates can be fed by several separated feeds. Typically, the agitation is achieved by a rotating impellor but other solutions—like circulating flows are also possible. The precipitation reaction preferably is a continuous precipitation where feeds are inserted to a reactor which has an overflow and product is continuously discharged from the reactor. Alternatively, the precipitation reaction can also be performed in a batch process. Besides the basic flows of sodium carbonate and metal sulfate further flows can be added like metal chlorides sodium bicarbonate, ammonium carbonate etc. The authors observed that during the metal carbonate precipitation it is much more difficult to keep the particle size stable compared to the hydroxide precipitation—meaning that it is more difficult to run a steady state precipitation by controlling the $Na_2CO_3/MSO_4$ base: acid flow rate. The authors observed that the flow rate ratio which results in a desired Na/S impurity ratio and level in the $MCO_3$ precipitate—when steady state would be reached—results in very large particles, often exceeding 30 µm. These particles are too large for battery applications. The current invention supplies a solution to this problem, and the $Na_2CO_3/MSO_4$ ratio is kept at a ratio which results in a preferred Na/S ratio. To control the particle size an external seeding approach is applied. During precipitation suitable small particles are added, that act as seeds, and by controlling the addition rate of seeds the particle size of the precipitate $MCO_3$ can be controlled, as is described in co-pending application EP14188028.6 That patent also provides an ammonia free precipitation process for the carbonate precursor of this invention, the process being suitable for mass production.

After precipitation, the precipitate is separated from the liquid by a suitable separation technique such as filtering. Generally, an ion exchange operation (for example washing with a caustic NaOH solution) is not needed. Washing with caustic solution can adjust the sodium and sulfur content. For example, a caustic wash, by exposing the impurity containing carbonate to a diluted base like NaOH, is suitable to reduce the sulfur impurity content. The filtering or caustic wash is typically followed by a washing process using water. Careful washing can remove a fraction of the present impurities. Then the carbonate precursor is dried at a typical drying temperature below 400° C. Alternatively, the carbonate can be roasted at a higher temperature. The mixed metal carbonate is then mixed with a Li-source—for example $Li_2CO_3$ followed by firing in oxygen containing atmosphere. Because of the simultaneous presence of Li Na and sulfur after—after sintering—$LiNaSO_4$ is present in the lithium transition metal. The resulting product is a sodium and sulfur containing transition metal carbonate which is especially suitable as precursor for lithium transition metal cathode materials. There are variations possible to this process. For example, $Li_2CO_3$ could also be added to the washed (moist) filter cake, followed by drying or prefiring.

The final cathode material has a preferred morphology. Particles have spherical shape and exhibit an open porosity. The BET surface area is larger than that of similar shaped but dense particles. The open porosity is tightly related to the use of mixed metal carbonate precursors. The authors believe that during firing an important step is the initial release of $CO_2$ from $MCO_3$, whereas the lithiation reaction starts at a slightly higher temperature. The reaction equation for the $CO_2$ release can be written as $MCO_3 \rightarrow MO_{1+x}CO_2$. In the case of x=0 from 5 atoms (M+C+3O) only 2 remain in the solid. The authors assume that the release of $CO_2$ from the center of the particles creates "chimneys" which ultimately result in an open porosity of the final cathode material.

By applying a suitable firing profile the open porosity remains in the final cathode product. It is relatively easy to achieve the open porosity if the cathode material is prepared at small scale. If however the cathode material is fired in an industrial way, for example using trays where several kg of precursor blends are fired in one tray, then the open porosity is more difficult to achieve. The authors observed that it is very important to heat the blend slowly. It is particularly important that the tray is not heated fast at a temperature range between 300 and 500° C. A suitable temperature profile needs at least 2 hr to increase the temperature from 300 to 500° C. If the heating rate in this temperature is much faster, for example if it takes less than 1 hr to heat from 300 to 500° C. then the obtained cathode material has a poor performance.

In an embodiment of this patent a carbonate precursor is provided that allows the preparation of NMC cathode powders with higher surface area and open porosity, making the obtained NMC cathodes especially suitable for high power applications. The BET surface area is an important tool to estimate the open porosity. If particles are dense, the surface area is low, hence, if the surface area is significantly larger than expected for particles of a given size, then an open porosity is likely to be present. Many variations from the proposed process are possible.

The invention is further illustrated in the following examples:

Example 1: Precipitation of a Na and Sulfur Containing Carbonate

Figure 2:
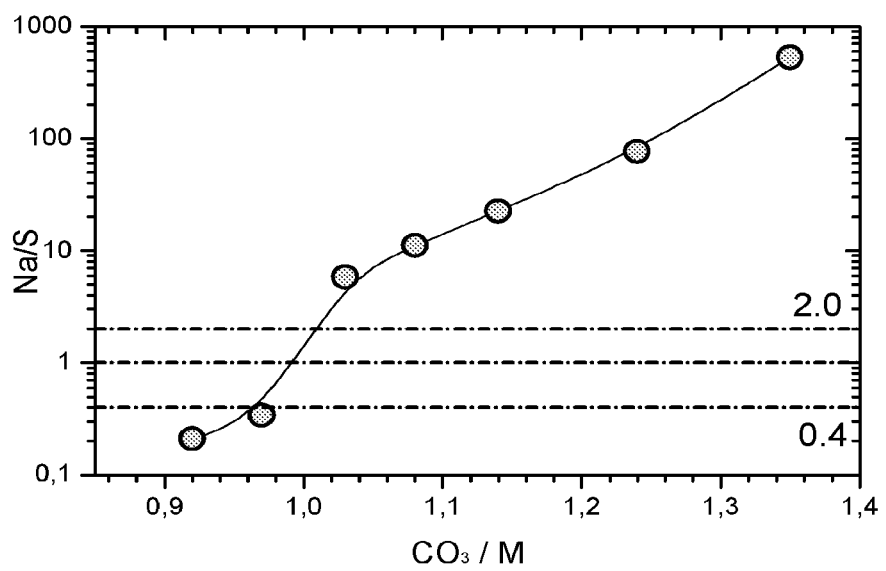
FIG. 2: Na/S ratio as function of ratio for carbonate precipitations where the $CO_3$/M flow ratio varies from 0.92 to 1.35

A first series of precipitations with varying acid to base flow rate ratios (7 samples) is performed as follows:
1) A solution of mixed metal sulfate with $M=Ni_{0.42}Mn_{0.42}Co_{0.16}$ (552) is prepared. The metal concentration is 2 mol/liter
2) A solution of $Na_2CO_3$ with concentration 2 mol $CO_3$ per liter is prepared
3) A continuous flow of the metal sulfate and the carbonate solution is fed into a water containing reactor under rigid stirring (1000 rpm). The reactor is kept at 90° C. The total flow rate is chosen to replace the volume of the reactor within 2.8 hours. The molar flow rate ratio of base to acid ($CO_3/SO_4$) is fixed at a value between 0.92 to 1.35. The flow rate is controlled and fixed gravimetrically. The precipitation is carried out for 6 h.
4) Small test samples are collected after each hour of operation (resulting in samples 1, 2, . . . 6). The particle size of the carbonate precipitate within the slurry is checked by laser diffraction.
5) A final sample is collected from hour 4 to hour 6. The final sample is repeatedly washed in water to remove any remaining salt; filtered and dried in air at 120° C.
6) The filter solution is collected and investigated for determining any content of non-precipitated metal. Also the excess of base ($Na_2CO_3$) is checked by pH titration The final sample is analyzed by XRD, BET surface area, tap density measurement, FESEM, ICP (of the elements Ni, Mn, Co, Na, S). Table 1 shows the results obtained for the final sample. The metal composition "552" is reached within 0.5% exactly (Ni=0.418, Mn=0.414, Co=0.166). Table 1 as well as FIG. 1 show the results for sodium and sulfur of the ICP analysis. Obviously a purely metal carbonate does not precipitate, and in all cases a relatively large impurity of sulfate and/or sodium is present. The sodium and sulfur was not removed by the washing. Many ion exchange attempts were undertaken but especially the removal of the sodium impurity is difficult. FIG. 1 shows a region where 1<Na/S<2. As will be shown later, these sodium and sulfur containing carbonates are excellent precursors for NMC type cathode materials. However, if Na/S>2 then the performance is very poor. The figure also shows a region 0.4<Na/S<1 which also yields excellent final NMC cathode materials. If Na/S<0.4 then the sulfur content is too high and the reversible capacity of the NMC cathode is insufficient. The dotted lines show preferred regions. Preferred precursors are located within the Na/S=2:1 and Na/S=0.4:1 lines. FIG. 2 shows the Na/S ratio as a function of base to acid ($CO_3$/M) ratio. As the flow rate ratio varies the Na/S ratio changes dramatically. Preferred precursors are within the narrow region of 0.4 to 2.0.

TABLE 1 results of chemical analysis of the final samples of the flow rate ratio series for precipitated carbonates with metal composition M = $Ni_{0.42}Mn_{0.42}Co_{0.16}$

| Measurement | Sample ID | MCO-0022 | MCO-0018 | MCO-0020 | MCO-0035 | MCO-0021 | MCO-0016 | MCO-0017 |
|---|---|---|---|---|---|---|---|---|
| base/acid | Mol ratio | 0.92 | 0.97 | 1.03 | 1.08 | 1.14 | 1.24 | 1.35 |
| Ni ICP | mol %/M | 41.8 | 41.7 | 41.9 | 41.9 | 41.9 | 42 | 41.9 |
| Mn ICP | mol %/M | 41.3 | 41.4 | 41.4 | 41.5 | 41.4 | 41.4 | 41.4 |
| Co ICP | mol %/M | 16.9 | 16.8 | 16.7 | 16.6 | 16.7 | 16.6 | 16.7 |
| ICP Na | wt % | 0.114 | 0.155 | 0.423 | 0.542 | 0.776 | 0.792 | 1.639 |
| ICP S | wt % | 0.767 | 0.643 | 0.102 | 0.068 | 0.048 | 0.014 | 0.004 |
| ICP Na | mol %/M | 0.28 | 0.39 | 1.05 | 1.35 | 1.93 | 1.97 | 4.07 |
| ICP S | mol %/M | 1.37 | 1.15 | 0.18 | 0.12 | 0.09 | 0.02 | 0.01 |
| Na/S | mol/mol | 0.21 | 0.34 | 5.8 | 11.2 | 22.5 | 76 | 530 |
| M mass | wt % | 43.9 | 46.8 | 47.6 | 46.6 | 47.6 | 46.9 | 45.1 |
| % $MCO_3$ | wt % | 90.0 | 96.0 | 97.5 | 95.5 | 97.5 | 96.1 | 92.4 |
| Na + $SO_4$ | wt % | 2.41 | 2.08 | 0.73 | 0.75 | 0.92 | 0.83 | 1.65 |

Figure 3:
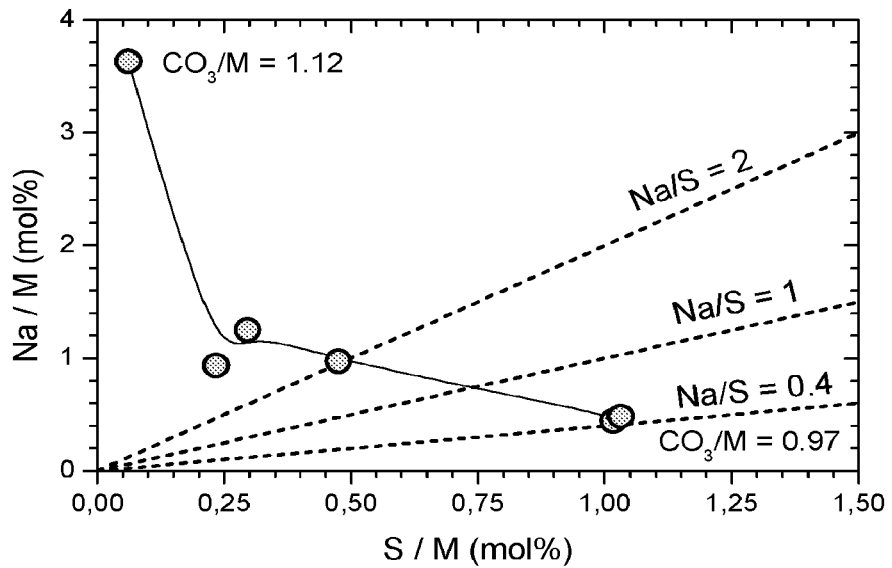
FIG. 3: Impurity map for carbonate precipitations where the $CO_3$/M flow ratio varies from 0.97 to 1.12

A second series of precipitations with varying base to acid flow rate ratios relatively close to the 1/1 ratio is performed using a solution of mixed metal sulfate with M=$Ni_{0.60}Mn_{0.20}Co_{0.20}$ (622). As in the experiment of the first series, the final sample is analyzed by XRD, BET surface area, tap density measurement, FESEM, ICP (of the elements Ni, Mn, Co, Na, S). Table 1.2 shows the obtained results for the final sample. The metal composition is exactly reproduced within 0.5% (Ni=0.6, Mn=0.2, Co=0.2). Table 2 as well as FIG. 3 show the ICP analysis results for sodium and sulfur. In all cases, a relatively large impurity of sulfate and/or sodium is present, a metal carbonate free of impurities cannot be precipitated.

Figure 4:
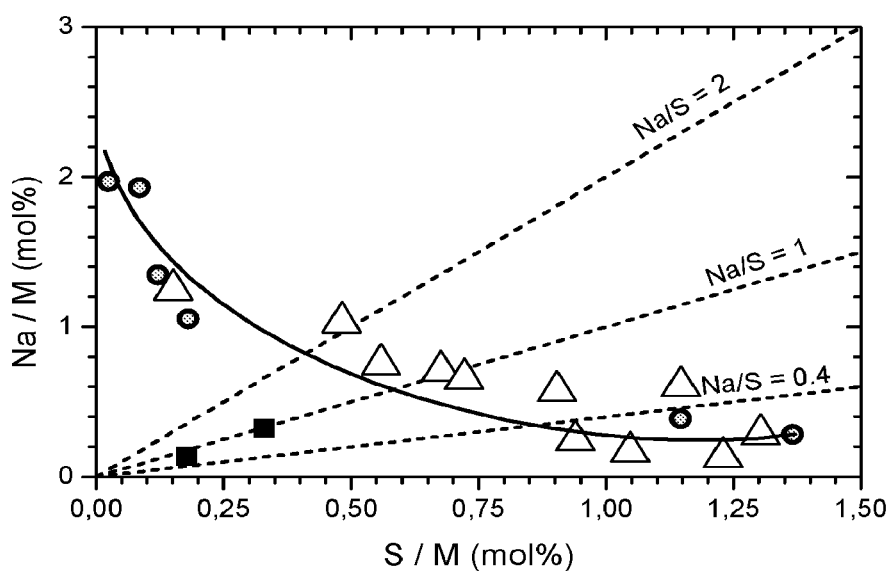
FIG. 4: Impurity map for precipitations of Na and Sulfur containing carbonate with different metal compositions

FIG. 4 shows the results of the ICP analysis for the impurities (○=Example 1, Δ=M series; ■=exceptions). Obviously a metal carbonate without impurities cannot be precipitated. In all cases, a sodium and/or sulfur impurity is present. FIG. 4 shows a preferred region where 1<Na/S<2. Generally, the carbonates with different metal compositions follow the trend shown in Example 1 for 552 (also shown on FIG. 2). Only a few exceptions (Ni free compounds precipitated with a low base/acid (CO3/M) flow rate ratio) have lower impurities. These Ni free compounds are not of interest as a precursor for NMC. The dotted line is a guide for the eye to locate typical impurities. By a suitable variation of flow rate ratio these impurities can be tuned so that the metal carbonate has a composition within the preferred region. 1<Na/S<2, respectively 0.4<Na/S<1.

TABLE 2 chemical analysis of the final samples of the flow rate ratio series for precipitated carbonates with metal composition M = $Ni_{0.60}Mn_{0.60}Co_{0.20}$

| Measurement | Sample ID | MCO-0101 g | MCO-0111 g | MCO-0102 g | MCO-0103 g | MCO-0095 g | MCO-0104 g |
|---|---|---|---|---|---|---|---|
| base/acid | Mol ratio | 0.97 | 1 | 1.03 | 1.06 | 1.08 | 1.12 |
| Ni ICP | mol %/M | 60.35 | 60.27 | 60.32 | 60.31 | 60.27 | 60.35 |
| Mn ICP | mol %/M | 19.67 | 19.71 | 19.75 | 19.74 | 19.78 | 19.67 |
| Co ICP | mol %/M | 19.99 | 20.02 | 19.92 | 19.96 | 19.95 | 19.99 |
| ICP Na | wt % | 0.18 | 0.19 | 0.38 | 0.5 | 0.37 | 0.18 |
| ICP S | wt % | 0.56 | 0.57 | 0.26 | 0.16 | 0.13 | 0.56 |
| ICP Na | mol %/M | 0.45 | 0.48 | 0.96 | 1.26 | 0.93 | 0.45 |
| ICP S | mol %/M | 1.01 | 1.03 | 0.47 | 0.29 | 0.23 | 1.01 |
| Na/S | mol:mol | 0.44 | 0.47 | 2.04 | 4.2 | 3.88 | 58.47 |
| M mass | wt % | 54.66 | 53.72 | 52.91 | 53.96 | 48.26 | 51.64 |
| % $MCO_3$ | wt % | 111.2 | 109.3 | 107.7 | 109.8 | 98.2 | 105.1 |
| Na + $SO_4$ | wt % | 1.856 | 1.90 | 1.16 | 0.98 | 0.76 | 1.53 |

Example 2: Precipitation of Na and Sulfur Containing Carbonate with Different Metal Compositions The preparation of metal carbonates of Example 1 is repeated with the difference that the metal composition of the mixed sulfate solutions is varied. For some compositions several flow rate ratios are used, in some cases only two flow rate ratios are tested. Generally the precipitation conditions are chosen to be near or within the desired region where the Na/S ratio is between 0.4 to 2. Table 3 summarizes the precipitation conditions as well as the obtained impurities.

TABLE 3 precipitation of different metal ratios and selected $CO_3$/M (base/acid) ratios

| Sample ID | composition Ni Mn Co | base/acid Mol ratio | ICP Na mol % | ICP S mol % | Na/S Mol ratio |
|---|---|---|---|---|---|
| MCO-0089 | 100 | 1.08 | 0.90 | 0.57 | 1.58 |
| MCO-0090 | 010 | 1.08 | 2.42 | 0.20 | 12.21 |
| MCO-0091 | 001 | 1.08 | 0.18 | 0.14 | 1.29 |
| MCO-0092 | 110 | 1.08 | 1.23 | 0.13 | 9.34 |
| MCO-0093 | 011 | 1.08 | 2.54 | 0.07 | 35.1 |

TABLE 3-continued precipitation of different metal ratios
and selected CO$_3$/M (base/acid) ratios

| Sample ID | composition Ni Mn Co | base/acid Mol ratio | ICP Na mol % | ICP S mol % | Na/S Mol ratio |
|---|---|---|---|---|---|
| MCO-0094 | 1 0 1 | 1.08 | 0.33 | 0.32 | 1.02 |
| MCO-0095 | 6 2 2 | 1.08 | 0.94 | 0.24 | 3.88 |
| MCO-0096 | 5 3 2 | 1.08 | 1.05 | 0.17 | 6.3 |
| MCO-0097 | 2 6 1 | 1.08 | 2.48 | 0.28 | 9.01 |
| MCO-0098 | 22 78 0 | 1.08 | 2.57 | 0.32 | 8.02 |
| MCO-0104 | 6 2 2 | 1.12 | 3.63 | 0.06 | 58.47 |
| MCO-0105 | 1 0 0 | 1.00 | 0.65 | 1.42 | 0.46 |
| MCO-0106 | 0 1 0 | 1.00 | 1.15 | 0.60 | 1.9 |
| MCO-0107 | 0 0 1 | 1.00 | 3.76 | 1.53 | 2.46 |
| MCO-0108 | 1 1 0 | 1.00 | 0.68 | 0.71 | 0.96 |
| MCO-0109 | 0 1 1 | 1.00 | 1.30 | 0.28 | 4.63 |
| MCO-0110 | 1 0 1 | 1.00 | 0.15 | 1.25 | 0.12 |
| MCO-0111 | 6 2 2 | 1.00 | 0.48 | 1.03 | 0.47 |
| MCO-0112 | 5 3 2 | 1.00 | 0.56 | 0.75 | 0.74 |
| MCO-0113 | 2 6 1 | 1.00 | 1.61 | 0.51 | 3.13 |
| MCO-0114 | 1 1 1 | 1.00 | 0.72 | 0.66 | 1.1 |
| MCO-0119 | 2 6 1 | 1.03 | 1.67 | 0.47 | 3.57 |

Example 3: Variation of Precipitation Conditions

Figure 5:
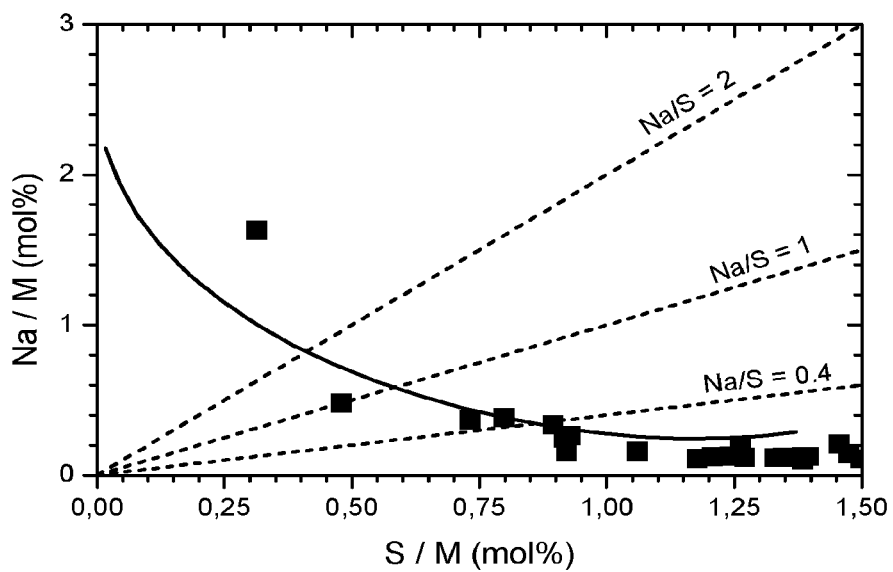
FIG. 5: Impurity map obtained for samples after wide change of precipitation conditions

In this example the precipitation conditions are varied to investigate possibilities to derivate from the general trend for Na and S impurities as a function of CO$_3$/M flow ratio. In some cases 10% of the Na$_2$CO$_3$ is replaced by 2NaHCO$_3$ (in this case the Na concentration is fixed at 4 mol/L; the flow rate ratio is defined as 0.5*Na/SO$_4$). In some cases 10% of the Na$_2$CO$_3$ is replaced by NaOH (2 mol NaOH per 1 mol Na$_2$CO$_3$). In some cases the precipitation temperature is changed (to 25° C.), in some cases the concentrations of the reactants are changed, in some cases seeding technology is applied, in some cases the geometry of the reactor is changed, in some cases the residence time is changed. For most experiments a metal composition NMC=552 is used. The conclusion is that generally the MCO$_3$ contains impurities, in no case an impurity free MCO$_3$ is obtained. FIG. 5 summarizes the results.

Figure 6:
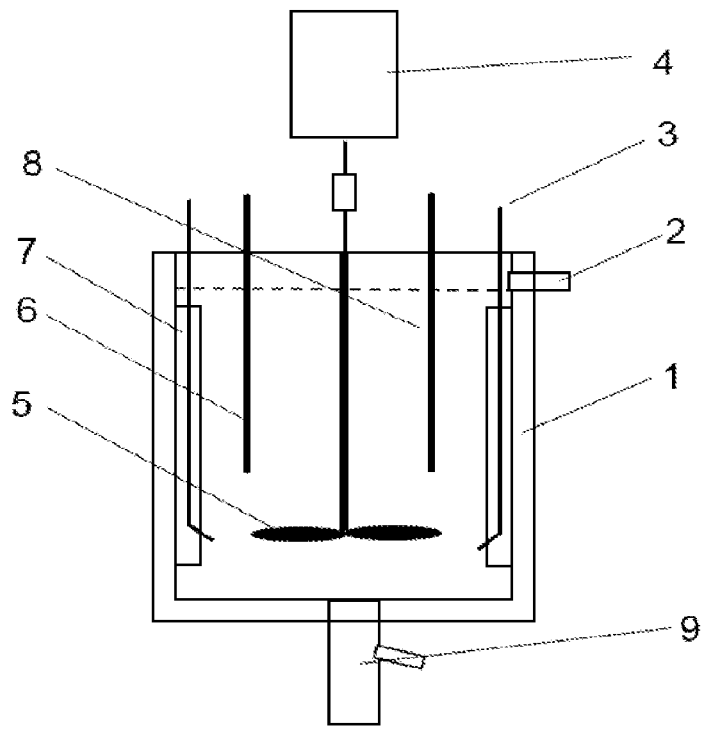
FIG. 6: design of a typical 10 L CSTR reactor

Example 4: Impossibility of Conventional PSD Control for Sodium and Sulfur Containing Transition Metal Carbonates This example shows the difficulties to control the PSD of metal carbonate precipitates. A preferred precipitation process is a continuous process (also known as continuous flow reactor). FIG. 6 shows the design of a continuous stirred tank reactor (CSTR), with the following references:

| 1 | Water jacket | 2 | Overflow |
|---|---|---|---|
| 3 | Dosing tube | 4 | Motor |
| 5 | Impeller | 6 | pH senor |
| 7 | Baffle | 8 | Temperature sensor |
| 9 | Outlet valve | | |

Figure 7:
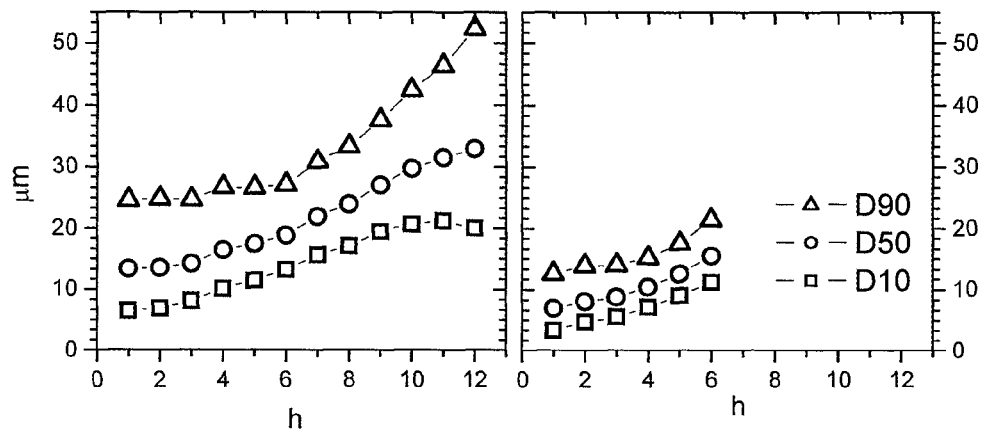
FIG. 7: Particle size of particles in the overflow as a function of precipitation time

The alternative—a batch process—is at mass production level logistically more demanding. FIG. 7—left part—shows the result of an extended precipitation for 12 hours with a residence time of 2.7 h (particle size (D50) versus precipitation time (h)). The metal composition is 552, the base to acid flow molar ratio (CO$_3$/M) is 1.24. Apparently, at the beginning of the precipitation relatively small particles precipitate, having a D50 of about 12 μm. Continuous flows of Na$_2$CO$_3$ and MSO$_4$ are added and the precipitated product overflows. During precipitation, the PSD of the overflow is checked. Obviously, the D50 grows continuously. After 12 h the precipitation might slowly approach a steady state, and in this state the D50 is above 30 μm, which is too large for many applications. The authors believe to understand the growth process well (nucleation rate, dilution of nuclei by overflow, growth rate . . . ); however it is beyond the scope of this patent application to discuss the growth model in detail. The experiment is repeated at a flow ratio which will yields precursors with impurities within the desired Na/S range, and a flow ratio of 1.02 is chosen. FIG. 7—right part—shows the parameters of the PSD as a function of time. Obviously also for the 1.02 condition the D50 value grows constantly, showing that a PSD control is difficult. If for example a D50 of 10 micrometer would be desired, it could not be achieved by the "uncontrolled" carbonate precipitation process.

Example 5: Control of Particle Size in the Carbonate Precipitation Process

Figure 8:
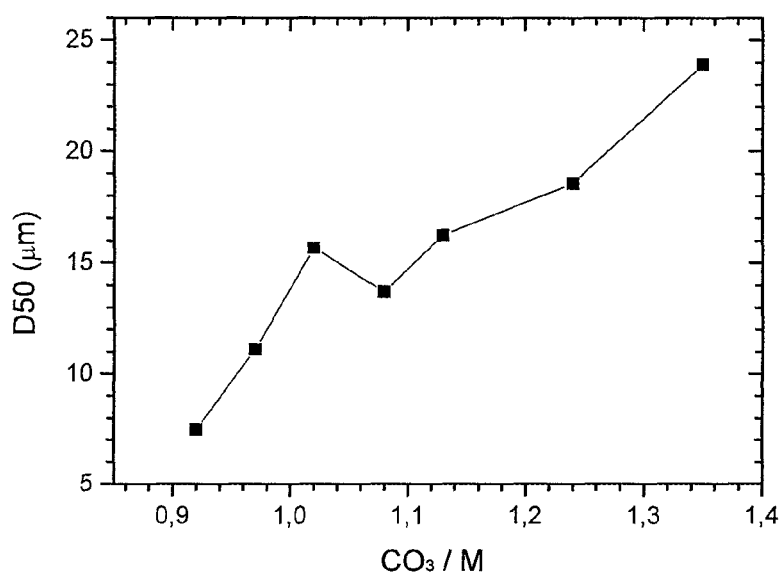
FIG. 8: D50 as a function of base/acid flow ratio in carbonate precipitation

A typical precipitation process for mixed hydroxides is a continuous precipitation where the particle size is adjusted by carefully controlling the flow rate (acid to base) ratios. This approach is based on the fact that for a certain flow rate ratio a distinct steady state particle size is obtained. Therefore, if the base/acid ratio increases, typically the PSD of the precipitate during steady state decreases, so small variations of the acid to base flow rate ratio are utilized to control the particle size in a narrow desired range. The underlying scientific reason is the dependence of nucleation rate on pH. As the pH increases the nucleation rate increases and the particle size decreases. This example will show that such a process is virtually impossible for sodium and sulfur containing mixed carbonate. As in the invention, the flow rate ratio is determined by the need to achieve a desired sodium to sulfur ratio, it is adjusted in that sense. Therefore the PSD cannot be controlled independently of the control of the impurities. As shown in Example 4, this is because the particle size which is obtained during the continuous precipitation is very large when the Na/S ratio is the determining factor during precipitation. Table 4 shows the final PSD parameters after 6 hours of precipitation, M being the 552 composition of Example 1. In most cases, steady state was not even reached so the D50 would grow further if the precipitation would continue. If a desired PSD would be 10 μm this can only be achieved by choosing a CO$_3$/M below 0.97. However, at these conditions the sulfur impurity of the precipitated hydroxide is very high and the Na to S value is less than the desired 0.4 ratio. FIG. 8 shows the increase of the D50 value as a function of the flow rate CO$_3$/M. Obviously both Na/S impurity ranges (see Example 1, 2) as well as PSD ranges (see Example 4, 5) strongly depend on the same flow ratio. Therefore it is not possible to precipitate a MCO$_3$ precursor which has a desired impurity level and at the same time achieve a desired particle size.

TABLE 4

Analysis results of MCO₃ samples from CO₃/M series after 6 h precipitation

| Sample ID | CO₃/M | PSD/Wet <3 μm wt % | D10 μm | D50 μm | D90 μm | D100 μm | SPAN | BET m²/g | TD g/cm³ | Na/S Mol/mol |
|---|---|---|---|---|---|---|---|---|---|---|
| MCO-0022 | 0.92 | 12.42 | 2.40 | 7.46 | 15.75 | 33.17 | 1.79 | 109.5 | 1.49 | 0.21 |
| MCO-0018 | 0.97 | 9.27 | 3.40 | 11.10 | 20.81 | 38.54 | 1.57 | 173.5 | 1.51 | 0.34 |
| MCO-0020 | 1.02 | 0.00 | 10.31 | 15.66 | 23.96 | 39.54 | 0.87 | 154.5 | 1.62 | 5.8 |
| MCO-0035 | 1.08 | 0.00 | 8.87 | 13.71 | 21.30 | 38.17 | 0.91 | 81.5 | 1.61 | 11.2 |
| MCO-0021 | 1.13 | 0.00 | 10.00 | 16.25 | 23.94 | 38.76 | 0.79 | 136.6 | 1.63 | 22.5 |
| MCO-0016 | 1.24 | 0.00 | 12.19 | 18.55 | 28.39 | 48.37 | 0.87 | 157.5 | 1.61 | 76 |
| MCO-0017 | 1.35 | 0.00 | 15.69 | 23.90 | 36.20 | 59.14 | 0.86 | 129.1 | 1.63 | 530 |

SPAN = (D90 − D10)/D50

Example 6: PSD Control by Applying Seeding Technology

As shown in previous examples, one of the metal carbonate precipitation process ($Na_2CO_3 + MSO_4 \rightarrow Na_2SO_4 + MCO_3$) problems is PSD control. Contrary to the case of hydroxide precipitation, where particle size is controlled by flow rate control (($OH)_2$/M), in case of carbonate precipitation, we cannot easily produce different sizes of metal carbonate precursor because this precipitation process is much more sensitive to flow rate control than the metal hydroxide precipitation process. It was found that seeding technology during metal carbonate precipitation permits to control the particle size accurately and to achieve easily a steady state process, as is disclosed in co-pending application EP14188028.6.

In one embodiment, the process goes as follows:
Seed preparation process: Steps (1) and (2)
Step (1): Ball mill process of metal carbonate seeds: metal carbonate powders prepared previously are ball milled with ceramic balls in a bottle for 3 days.
Step (2): Collecting of the ball milled metal carbonate slurry from the bottle, followed by sieving.
Metal carbonate precipitation process with seeding technology: steps (3) to (5)
Step (3): Dissolution process of metal sulfate: nickel sulfate hexahydrate, manganese sulfate monohydrate and cobalt sulfate heptahydrate are dissolved in $H_2O$. A typical concentration of this solution is 2 mol/L.
Step (4): Precipitation process of metal carbonate precursor with $Na_2CO_3$: typical temperature of metal carbonate precipitation is 90° C. In the CSTR reactor, stirring speed is 1000 RPM. Residence time is 2 hrs. Metal carbonate seed slurry is added into the reactor once an hour.
Step (5): Washing and drying process of the metal carbonate precursor: deionized water is used for washing. The resulting wet cake is dried at 150° C. for more than 16 hrs.
There is a strong effect of the seeding technology to control the PSD during metal carbonate precipitation, and there is no negative influence on other parameters. First of all, when a constant amount of seeds (in the form of metal carbonate slurry) is added during the metal carbonate precipitation process, but with different flow rates (CO₃/M), the PSD is controlled and stabilized by the seeding technology, independent from the different flow rate (CO₃/M). However, the impurity level is still strongly dependent on the flow ratio. Secondly, when different amounts of seeds are added during the metal carbonate precipitation process, coupled to a fixed flow rate (CO₃/M), the PSD is changed according to the seed/product ratio in the reactor, even though the same flow rate ratio is used. Here however, the impurity level is not influenced. These experimental results are illustrated in Table 5 and 6. The conclusion is that the PSD control and stabilization during the metal carbonate precipitation process is achieved through the seeding technology. It follows that the seeding technology allows to adapt the particle size during a metal carbonate precipitation depending on the application of the final cathode product. It also follows that once the particle size is controlled, the flow rate ratio determines the Na/S ratio.

Figure 9:
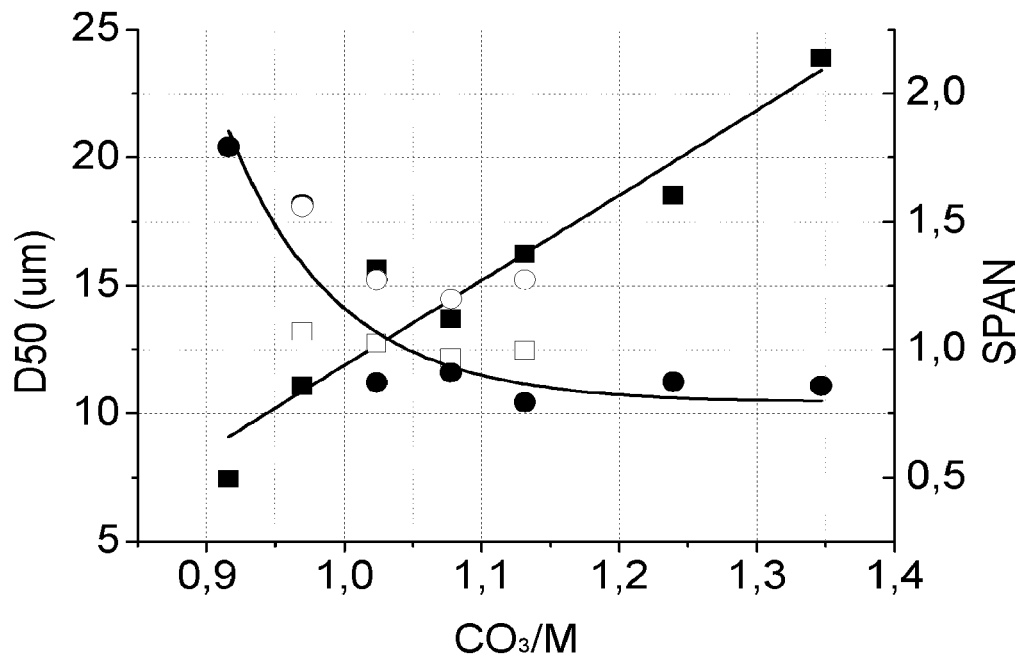
FIG. 9: PSD (D50, SPAN) results of $MCO_3$ samples from same amount of seed and different $CO_3$/M ratio
Figure 10:
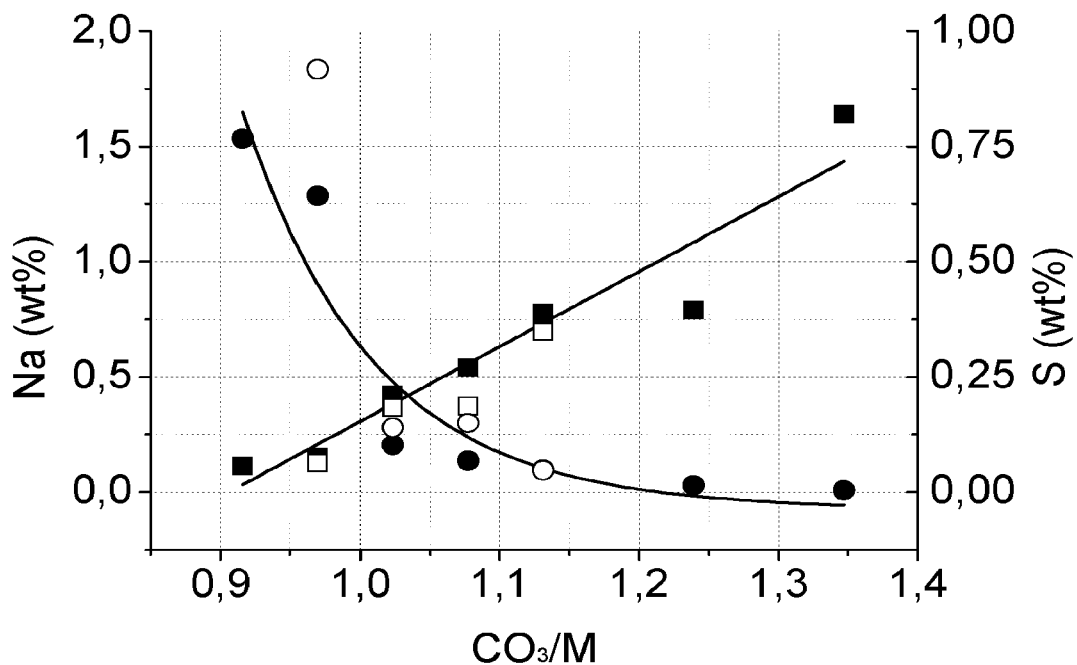
FIG. 10: ICP (Na, S) results of $MCO_3$ samples from same amount of seed and different $CO_3$/M ratio
Figure 11:
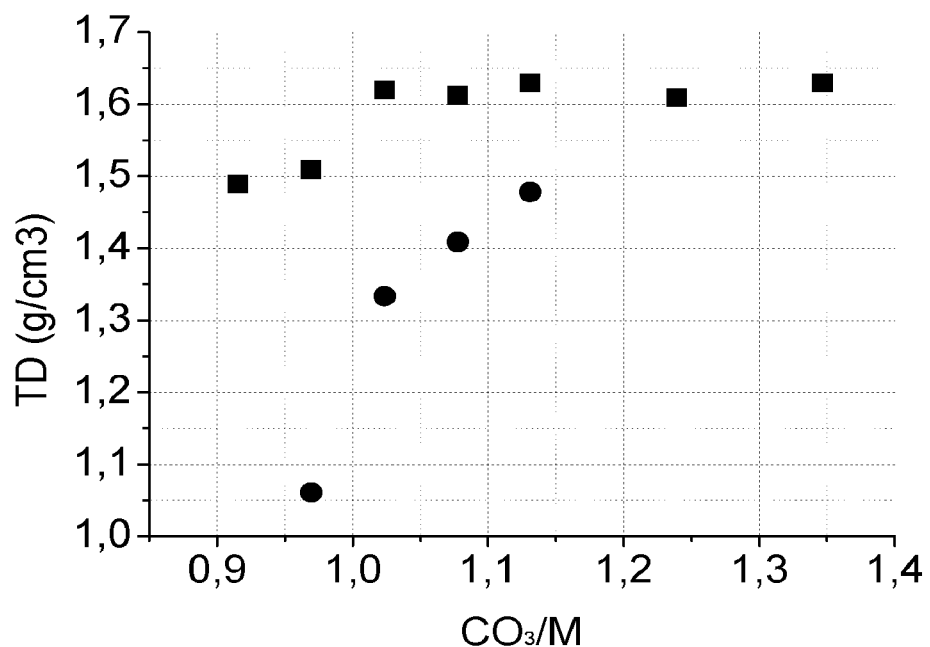
FIG. 11: Tap density (TD) results of $MCO_3$ samples from same amount of seed and different CO3/M ratio

FIG. 9 shows the PSD (D50, SPAN) results of MCO₃ samples (■=D50 (μm) for the CO₃/M series without seeding, □=the same for the series with seeding, ●=the span for the series without seeding, ○=the span with seeding) from the same amount of seed and different CO₃/M ratios (see Table 5). FIG. 10 shows the ICP (Na, S) results of MCO₃ samples (■=Na (wt %) for the CO₃/M series without seeding, □=the same for the series with seeding, ●=S (wt %) for the series without seeding, ○=the same with seeding) from the same amount of seed and different CO₃/M ratios (see Table 5). Finally, FIG. 11 shows the tap density (TD) results of MCO₃ samples (■=TD (g/cm³) of CO₃/M series without seeding and ●=the same for the series with seeding) from the same amount of seed and different CO₃/M ratio (Table 5). In each Figure the results of precipitations without seeding are also given, and are based on the samples in Table 1.

TABLE 5

Analysis results of MCO₃ samples from same amount of seed and different CO₃/M ratio

| Sample ID | CO₃/M | PSD/Wet <3 μm wt % | D10 μm | D50 μm | D90 μm | D100 μm | SPAN | TD g/cm³ | ICP Na wt % | S wt % | Na/S |
|---|---|---|---|---|---|---|---|---|---|---|---|
| MCO-0065 | 0.97 | 5.47 | 5.40 | 13.22 | 25.99 | 62.34 | 1.56 | 1.06 | 0.127 | 0.916 | 0.2 |
| MCO-0066 | 1.02 | 2.66 | 6.63 | 12.77 | 22.60 | 38.88 | 1.27 | 1.33 | 0.369 | 0.140 | 3.7 |

TABLE 5-continued

Analysis results of MCO₃ samples from same amount of seed and different CO₃/M ratio

| Sample ID | CO₃/M | PSD/Wet <3 μm wt % | D10 μm | D50 μm | D90 μm | D100 μm | SPAN | TD g/cm³ | ICP Na wt % | S wt % | Na/S |
|---|---|---|---|---|---|---|---|---|---|---|---|
| MCO-0067 | 1.08 | 0.00 | 6.85 | 12.20 | 21.45 | 38.72 | 1.20 | 1.41 | 0.374 | 0.149 | 3.5 |
| MCO-0068 | 1.13 | 0.00 | 6.76 | 12.49 | 22.65 | 38.78 | 1.27 | 1.48 | 0.697 | 0.046 | 21.1 |

TABLE 6

Analysis results of MCO₃ samples from different amount of seed and fixed CO₃/M ratio of 1.08

| Sample ID | seed/MCO₃ | PSD/Wet <3 μm wt % | D10 μm | D50 μm | D90 μm | D100 μm | SPAN | BET m²/g | TD g/cm³ | ICP Na wt % | S wt % | Na/S |
|---|---|---|---|---|---|---|---|---|---|---|---|---|
| MCO-0035 | 0.00% | 0.00 | 8.87 | 13.71 | 21.30 | 38.17 | 0.91 | 81 | 1.61 | 0.542 | 0.068 | 11 |
| MCO-0038 | 0.64% | 0.00 | 7.10 | 13.00 | 23.52 | 38.93 | 1.26 | 97 | 1.59 | 0.670 | 0.057 | 16 |
| MCO-0039 | 1.92% | 1.86 | 4.48 | 9.53 | 19.23 | 38.51 | 1.55 | 121 | 1.52 | 0.641 | 0.054 | 16 |
| MCO-0040 | 5.76% | 16.12 | 0.97 | 6.83 | 15.63 | 38.61 | 2.15 | 124 | 1.41 | 0.852 | 0.04 | 30 |

Example 7: Removal of Impurities by Ion Exchange

Besides the control of PSD, another problem of the metal carbonate precipitation process is impurity control. For lowering the sulfur content, caustic washing is applied, and washed metal carbonate precursors have a relatively low sulfur content compared to metal hydroxide precursors, as can be seen in the results of a caustic washing in Table 7. But the sodium content of metal carbonate precursors is higher than expected. An ion exchange experiment should investigate if chemicals are able to reduce the sodium content. Therefore, this example focuses on a precursor which has a high Na to S impurity ratio, in an attempt to remove the impurities. Such precursors are obtained for a flow rate ratio $CO_3/M>1.00$. This is of interest for mass production, because in these circumstances all transition metals precipitate and a small amount of remaining $Na_2CO_3$ in the waste water is no issue. By controlling washing time, temperature and kind of additive in the ion exchange experiment, it was tried to reduce the sodium content. However this proved to be too difficult, and to effectively reduce the sodium impurity, too much time, or too expensive chemicals are needed.

TABLE 7

ICP (Na, S) results of MCO₃ samples from CO₃/M series after caustic washing

| Sample ID | CO₃/M | ICP Na wt % | S wt % |
|---|---|---|---|
| CLX-007a | 0.97 | 0.109 | 0.060 |
| CLX-002a | 1.02 | 0.170 | 0.071 |
| CLX-006a | 1.08 | 0.454 | 0.036 |
| CLX-005a | 1.13 | 1.615 | 0.015 |

TABLE 8

ICP (Na, S) results of MCO₃ samples from ion exchange experiment with different chemicals

| Sample ID | Ion exchange condition Time min | Temperature °C. | Additive | ICP Na wt % | S wt % |
|---|---|---|---|---|---|
| MCO-0034ca | 10 | 25 | Simple wash (reference) | 1.159 | 0.018 |
| MCO-0034cb | 180 | 25 | H₂O | 0.937 | 0.017 |
| MCO-0034ce | 180 | 50 | H₂O | 0.883 | 0.047 |
| MCO-0034cf | 30 | 25 | H₂O | 1.173 | 0.014 |
| MCO-0034cg | 30 | 80 | H₂O | 0.909 | 0.053 |
| MCO-0034ch | 30 | 25 | 0.01 mol H₂SO₄ | 1.163 | 0.053 |
| MCO-0034ci | 30 | 25 | 0.01 mol C₂H₂O₄ | 1.103 | 0.020 |
| MCO-0034cj | 30 | 25 | 0.1 mol MeSO₄ | 1.139 | 0.087 |
| MCO-0034ck | 30 | 25 | 0.1 mol LiOH | 0.940 | 0.022 |
| MCO-0034cl | 30 | 25 | 0.1 mol MnSO₄ | 1.091 | 0.066 |
| MCO-0034ct | 30 | 25 | CO₂ bubbling | 0.940 | 0.033 |
| MCO-0034cx | 30 | 25 | 0.01 mol Li₂SO₄ | 1.037 | 0.027 |
| MCO-0034cm | 30 | 80 | 0.01 mol C₂H₂O₄ | 0.766 | 0.019 |
| MCO-0034cn | 30 | 80 | 0.1 mol LiOH | 0.239 | 0.024 |
| MCO-0034cs | 30 | 80 | 0.01 mol LiOH | 0.567 | 0.029 |
| MCO-0034co | 30 | 80 | 0.1 mol MnSO₄ | 0.640 | 0.327 |
| MCO-0034cu | 30 | 80 | CO₂ bubbling | 0.758 | 0.035 |
| MCO-0034cy | 30 | 80 | 0.01 mol Li₂SO₄ | 0.633 | 0.174 |
| MCO-0034cv | 120 | 80 | 0.01 mol LiOH | 0.281 | 0.004 |
| MCO-0034da | 120 | 80 | 0.01 mol KOH | 0.619 | 0.040 |
| MCO-0034db | 120 | 80 | 0.005 mol LiOH + 0.005 mol KOH | 0.720 | 0.041 |
| MCO-0034dc | 120 | 80 | 0.01 mol LiOH* | 0.333 | 0.028 |
| MCO-0034cp | 300 | 150 | H₂O | 0.706 | 0.010 |
| MCO-0034cq | 300 | 150 | 0.1 mol N₂H₄ | 0.257 | 0.010 |
| MCO-0034cr | 300 | 150 | 0.01 mol N₂H₄ | 0.293 | 0.005 |
| MCO-0034cz | 300 | 150 | 0.005 mol LiOH + 0.005 mol N₂H₂ | 0.313 | 0.004 |
| MCO-0034cw | 300 | 150 | 0.002 mol N₂H₄ | 0.454 | 0.056 |

Note:
LiOH* refers to a double wash, MeSO₄ refers to $Ni_{0.6}Mn_{0.2}Co_{0.2}SO_4$

Example 8: Preparation and Testing of NMC Cathode Material Using S and Na Containing $MCO_3$ Precursors A metal carbonate precursor is prepared using a 4 L stirred (1000 rpm) reactor. The temperature is 90° C. Two accurately controlled flows of $Na_2CO_3$ and $MSO_4$ that are dissolved in water are continuously injected into the reactor. The base to acid flow rate ratio $CO_3/M$ is 1.03. The metal composition of the $MSO_4$ flow is M=NMC 552. The concentration of the $Na_2CO_3$ and $MSO_4$ flow is 2 mol/L. The residence time, i.e. the time needed to replace 1 reactor content, is 2.75 h. A seeding technique is used. Seeds are obtained by ball milling $MCO_3$ obtained from an earlier precipitation. The D50 of the seeds is 0.5 µm. The slurry containing the seeds is frequently injected in the reactor, with a weight ratio between injected seed and precipitated product of 0.63%. The precipitation starts after filling half of the reactor with water. The precipitation is performed for 12 hours. Overflowing product is collected starting from hour 4. After 12 hours the reactor content as well as the collected overflow are repeatedly filtered and washed in water. The precipitation is repeated several times in exactly the same manner to obtain a sufficient amount of product. During precipitation the PSD is checked every hour. The precipitation process was found to be very stable, with a value for D50 that varies by less than 2 µm, the resulting D50 being 13±1.5 µm. After filtering and washing the product is dried overnight at 120° C. in air.

Figure 12:
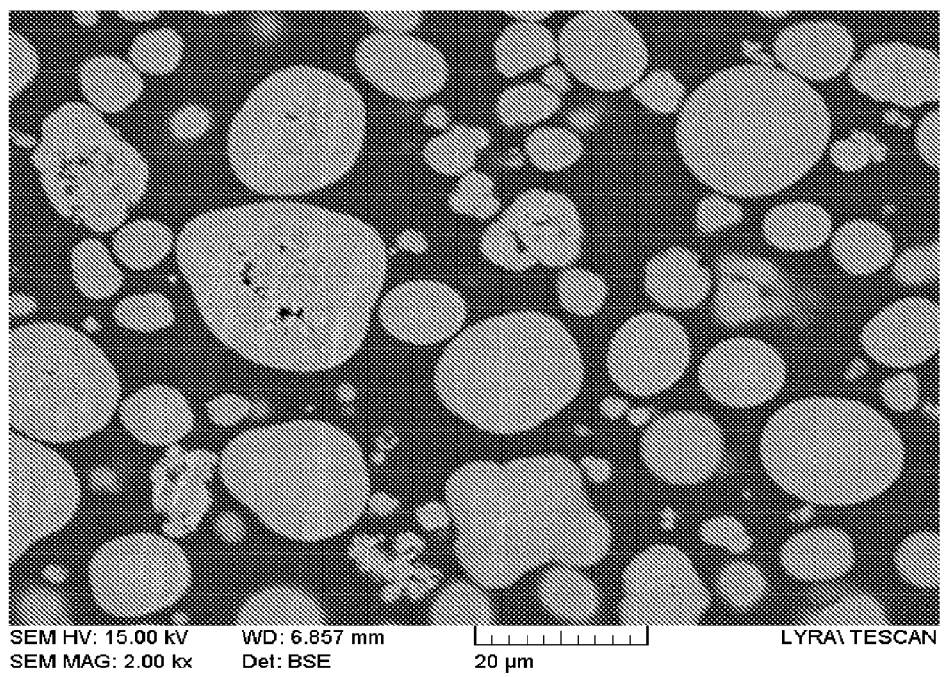
FIG. 12: SEM cross section of the $MCO_3$ precipitate according to the invention

The obtained precursor products are mixed and analyzed. The tap density is 1.4 g/cm$^3$. An ICP analysis confirms that the desired metal composition (552) has been achieved, the composition being Ni:Mn:Co=41.87:41.43:16.70. The final $MCO_3$ precursor product contains 3300 ppm Na and 2400 ppm sulfur, resulting in a sodium to sulfur molar ratio of 1.9, which is within the desired 0.4<Na/S<2 region. The metal content is 49.9 wt %, which is slightly more than the theoretical value for impurity free $MCO_3$ (=48.80 wt %), which is consistent with the presence of $SO_4$ and Na impurities. FIG. 12 shows the SEM cross section of the final precipitate. The particles are relatively dense and no hollow shell structure is observed. The shape of many particles is near to spherical.

Next, two samples of cathode powder are prepared. One sample is basically free of impurities, the other sample contains the sodium and sulfur impurity that remains from the $MCO_3$ precursor product. Preparation of the impurity free sample (LX0142): the carbonate precursor is blended with $Li_2CO_3$, obtaining a Li:M molar ratio of 1.10—assuming that $Li_2CO_3$ has a purity of 97%. 2 kg of this blend are slowly heated to 945° C. in a flow of air of 10 L/kg·min, and the sintering is continued for 10 h. After cooling, the sample is immersed in water (1 kg per 2 L) for 10 min under stirring, filtered and dried (for 16 hrs at 150° C.). Since the original sulfur and sodium impurities are present as soluble $Li_2SO_4$, $LiNaSO_4$ or $Na_2SO_4$ compounds, the water treatment effectively removes the remaining impurities. In general, a water treatment chemically damages the surface of the cathode material particles resulting in poor cycle stability in real cells. Therefore a "healing" heat treatment is applied. (The morphology does not change substantially during water exposure). After soft milling the dried intermediate sample is heated at 375° C. for 20 hrs. After cooling the sample is sieved. The particle size of the carbonate precursor remained, the D50 of the obtained cathode is 14 µm.

Preparation of the sample containing the impurities (LX0143): the carbonate precursor is blended with $Li_2CO_3$, obtaining a Li:M molar ratio of 1.10—assuming that $Li_2CO_3$ has a purity of 97%. 2 kg of this blend is slowly heated to 945° C. in a flow of air of 10 L/kg·min, and the sintering is continued for 10 h. After cooling, the sample is softly grinded and reheated (similar as sample LX0142) for 20 h at 375° C. (The reheating was done to prepare LX0142 with the same temperature profile as sample LX0143. We expect that performance without the reheating would be similar). After cooling the sample is sieved.

Figure 13:
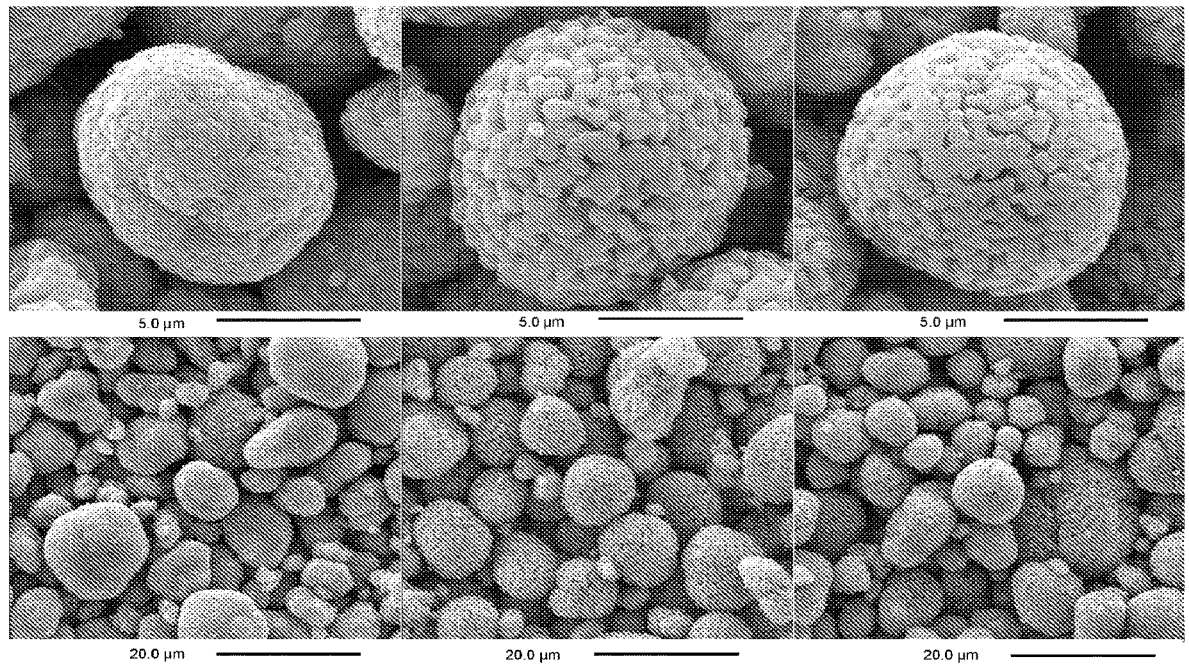
FIG. 13: SEM micrograph of 552 NMC cathodes prepared with $MCO_3$ precipitate
Figure 14:
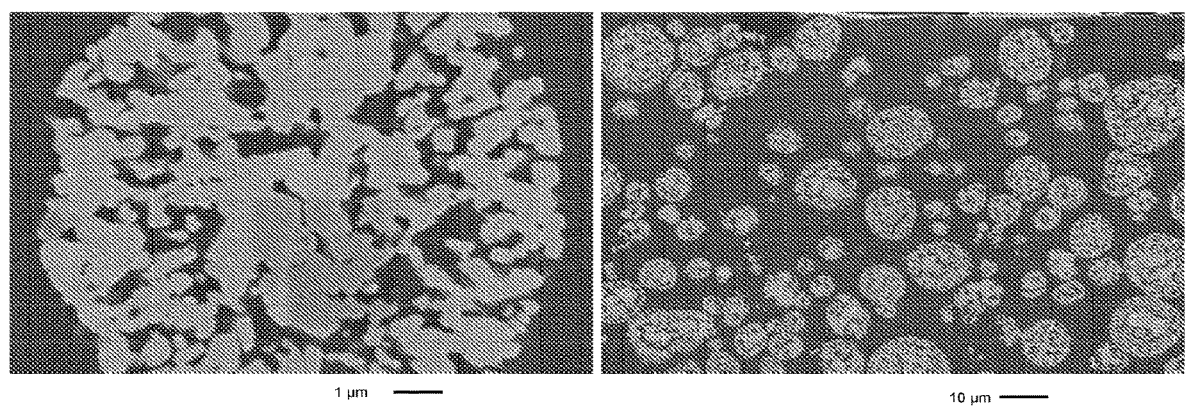
FIG. 14: Cross section of the 552 NMC cathode LX0142

A reference optimized cathode powder LX0031 is prepared from a dense, 10 µm hydroxide precursor. Conditions are similar to conditions qualified for mass production. Table 9 displays the results for ICP and surface area measurements of the NMC cathode samples. FIG. 13 shows the SEM micrograph of the cathodes: Left: LX0031 (reference prepared from $M(OH)_2$ precursor), Middle: Impurity free LX0142 sample (with intermediate wash), Right: Impurity containing LX0143 sample. FIG. 14 shows the cross section SEM of sample LX0142. Obviously the desired morphology is achieved. Particles are roughly spherical and have an open porosity. In the battery electrolyte will fill the pores and facilitate the fast Li diffusion into the inner of the particles, thus enabling a high power and low DCR.

Coin cells are prepared according to Umicore internal standard procedures (RL4345N): Electrodes are prepared as follows: about 27.27 wt. % of active cathode material, 1.52 wt % polyvinylidene fluoride polymer (KF polymer L #9305, Kureha America Inc.), 1.52 wt % conductive carbon black (Super P, Erachem Comilog Inc.) and 69.70 wt % N-methyl-2-pyrrolidone (NMP) (from Sigma-Aldrich) are intimately mixed by means of high speed homogenizers. The slurry is then spread in a thin layer (typically 100 micrometer thick) on an aluminum foil by a tape-casting method. After evaporating the NMP solvent, the cast film is processed through a roll-press using a 40 micrometer gap. Electrodes are punched from the film using a circular die cutter measuring 14 mm in diameter. The electrodes are then dried overnight at 90° C. The electrodes are subsequently weighed to determine the active material loading. Typically, the electrodes contain 90 wt % active materials with an active materials loading weight of about 17 mg (~11 mg/cm2). The electrodes are then put in an argon-filled glove box and assembled within the coin cell body. The anode is a lithium foil having a thickness of 500 micrometers (origin: Hosen); the separator is a Tonen 20MMS microporous polyethylene film. The coin cell is filled with a 1M solution of LiPF6 dissolved in a mixture of ethylene carbonate and dimethyl carbonate in a 1:2 volume ratio (origin: Techno Semichem Co.).

Each cell is cycled at 25° C. using Toscat-3100 computer-controlled galvanostatic cycling stations (from Toyo). The testing protocol is as follows:

| RL4345N schedule - with 1 C = 160 mA/g | | | | | | | | | |
|---|---|---|---|---|---|---|---|---|---|
| Charge | | | | Discharge | | | | | |
| C Rate | E-Curr | Rest (min) | V | Rate | E-Curr | Rest (min) | V | Num # | Num total |
| 0.10 | — | 30 | 4.3 | 0.10 | — | 30 | 3.0 | 1 | 1 |
| 0.25 | 0.05 C | 10 | 4.3 | 0.20 | — | 10 | 3.0 | 1 | 2 |
| 0.25 | 0.05 C | 10 | 4.3 | 0.50 | — | 10 | 3.0 | 1 | 3 |
| 0.25 | 0.05 C | 10 | 4.3 | 1.00 | — | 10 | 3.0 | 1 | 4 |
| 0.25 | 0.05 C | 10 | 4.3 | 2.00 | — | 10 | 3.0 | 1 | 5 |
| 0.25 | 0.05 C | 10 | 4.3 | 3.00 | — | 10 | 3.0 | 1 | 6 |
| 0.25 | 0.1 C | 10 | 4.5 | 0.10 | — | 10 | 3.0 | 1 | 7 |
| 0.25 | 0.1 C | 10 | 4.5 | 1.00 | — | 10 | 3.0 | 1 | 8 |

-continued

RL4345N schedule - with 1 C = 160 mA/g

| Charge | | | | Discharge | | | | | |
|---|---|---|---|---|---|---|---|---|---|
| C Rate | E-Curr | Rest (min) | V | Rate | E-Curr | Rest (min) | V | Num # | Num total |
| 0.50 | 0.1 C | 10 | 4.5 | 1.00 | — | 10 | 3.0 | 25 | 9-33 |
| 0.25 | 0.1 C | 10 | 4.5 | 0.10 | — | 10 | 3.0 | 1 | 34 |
| 0.25 | 0.1 C | 10 | 4.5 | 1.00 | — | 10 | 3.0 | 1 | 35 |
| 1.00 | — | 10 | 4.5 | 1.00 | — | 10 | 3.0 | 25 | 36-60 |

Coin cells are prepared wherein the electrode consists of 96 wt % of active material. The electrode loading is about 6 mg/cm². The discharge capacity of the first cycle (DQ1), the irreversible capacity of the first cycle (IRRQ1) and the rate capability of the 3C rate (in %) versus the 0.1C rate is reported. The discharge capacity DQ1 is measured during the first cycle in the 4.3-3.0 V range at 0.1C (in mAh/g), at 25° C. Irreversible capacity IRRQ1 is (Q1C−DQ1)/Q1 C (in %), QC being the charged capacity during the 1$^{st}$ cycle. Capacity fadings at Q0.1C and Q1C are expressed in % per 100 cycles. They are obtained from the capacity loss checked at fast 1C rate (comparing cycle 7 and 34) as well as from the capacity loss during 25 cycles checked at slow 0.1C rate (comparing cycle 8 and 35) extrapolating to 100 cycles. Q1C (H) is the fade rate at 1C/1C cycling obtained by comparing the capacity loss during 25 cycles obtained from cycle 36 and 60 and extrapolating the loss to 100 cycles. The results of the electrochemical tests are given in Table 10.

TABLE 9

ICP for impurities and surface area of cathodes

| | | ICP | | | ICP minor | | |
|---|---|---|---|---|---|---|---|
| Sample ID | Remark | Ni mol % | Co mol % | Mn mol % | Na wt % | S wt % | BET m²/g |
| LX0031 | M(OH)₂ | 41.79 | 41.57 | 16.65 | 0.0415 | 0.2029 | 0.386 |
| LX0143 | Impurities remain | 41.62 | 41.67 | 16.71 | 0.2955 | 0.3021 | 1.170 |
| LX0142 | Intermediate wash | 41.61 | 41.68 | 16.70 | 0.0492 | 0.0653 | 1.387 |

TABLE 10

Coin cell test results of cathodes

| | | Coin cell/RL4345N | | | | | |
|---|---|---|---|---|---|---|---|
| Sample ID | Remark | DQ1 mAh/g | IRRQ1 % | 3 C rate % | Q 0.1 C %/100 | Q 1 C %/100 | Q 1 C/1 C %/100 |
| LX0031 | M(OH)₂ | 155.7 | 12.44 | 81.16 | −0.32 | 3.26 | 13.74 |
| LX0143 | Impurities remain | 160.7 | 9.94 | 82.51 | 7.15 | 11.97 | 25.63 |
| LX0142 | Intermediate wash | 163.0 | 9.36 | 83.31 | 9.90 | 14.45 | 32.19 |

The results prove that 1) the surface area of the NMC obtained from sodium and sulfur containing carbonate (LX0142, LX0143) precursors is significantly higher than that of the reference NMC prepared from dense M(OH)2 precursor. The SEM micrograph strongly indicates that the large BET surface area originates from an open porosity, which is confirmed by the cross section SEM.

2) the open porosity and high BET improve the electrochemical performances significantly. The irreversible capacity of LX0142 & 143 is significantly less than that of the reference LX0031. For a given composition the charge capacity is more or less a fixed value. Thus—if the irreversible capacity decreases the reversible capacity increases. Therefore LX0143—having a nearly 2.5% lower (=9.94-12.44) irreversible capacity—yields a corresponding increased reversible capacity (by 3.2%) compared to the reference.

3) the impurity containing sample LX0143 has a 1.4% lower capacity than the impurity free sample LX0142. The lower capacity is consistent with the presence of inert alkali sulfate salts. The sodium and sulfur impurities are present as sulfate salts $Li_2NaSO_4$, $LiNaSO_4$ or $Na_2SO_4$, which do not contribute to the reversible capacity. We estimate that 1.3 wt % of salt is present. This perfectly explains the observed lower capacity (−1.4%) of sample LX0143 compared to LX0142.

4) Coin cell testing of LX0142 and LX0143 shows a better cycle stability of the impurity containing LX0143 compared to the impurity free LX0142.

Sample LX0143 which contains impurities is an example of the present invention. LX0142—being free of impurities—is prepared by a more expensive process and thus is industrially not preferred. Most important, however, the impurity free sample LX0142 shows less cycle stability. The authors have observed that the presence of sodium and sulfur impurities in a desired ratio and amount, surprisingly, causes improved cycle stability Example 9: Full Cell Tests Full cells are prepared. The full cells are of the wound pouch cell type and have a capacity of about 650 mAh. 3 different cathode materials are tested: Full cell lot #AL705 contains LX0031 which is the reference NMC obtained from hydroxide. Full cell lot AL885 contains the impurity free LX0142 and AL886 contains the impurity containing cathode LX0143. Overall AL886—containing LX0143 which is a NMC with desired morphology having a sodium and sulfur impurity within the preferred region shows excellent results.

In the following details of the cell making and testing are listed and discussed.

Full Cell Assembly

For full cell testing purposes, the prepared positive electrodes (cathode) are assembled with a negative electrode (anode) which is typically a graphite type carbon, and a porous electrically insulating membrane (separator). The full cell is prepared by the following major steps: (a) electrode slitting (b) electrode drying (c) jellyroll winding (d) packaging. (a) electrode slitting: after NMP or water-based coating the electrode active material might be slit by a slitting machine. The width and length of the electrode are determined according to the battery application.

(b) attaching the taps: there are two kinds of taps. Aluminum taps are attached to the positive electrode (cathode), and copper taps are attached to the negative electrode (anode).

(c) electrode drying: the prepared positive electrode (cathode) and negative electrode (anode) are dried at 85° C. to 120° C. for 8 hrs in a vacuum oven.

(d) jellyroll winding: after drying the electrode a jellyroll is made using a winding machine. A jellyroll consists of at least a negative electrode (anode) a porous electrically insulating membrane (separator) and a positive electrode (cathode).

(e) packaging: the prepared jellyroll is incorporated in a 800 mAh cell with an aluminum laminate film package, resulting in a pouch cell. Further, the jellyroll is impregnated with the electrolyte. The quantity of electrolyte is calculated in accordance with the porosity and dimensions of the positive electrode and negative electrode, and the porous separator. Finally, the packaged full cell is sealed by a sealing machine.

Full Cell Evaluation

Many different full cell evaluation tests are possible. The present invention shows the results for (a) cycle stability, (b) capacity and rate capability, (c) bulging, (d) storage test and (e) DCR resistance tests.

(a) Cycle stability: cells are fully charged and discharged for many hundreds of cycles. The cycling tests are performed at 25° C. or at elevated temperature (for example 45° C.) to accelerate unwanted side reactions, thus forcing a faster loss of capacity.

(b) Capacity and rate capability: capacity is the discharge capacity measured between 4.3V and 2.7V, at a rate of 0.2C rate. The efficiency is the ratio expressed in % between the first charge and the first discharge capacity. The rate capability is the discharge capacity at a rate of 0.5; 1.0; 2.0; 3.0 and 4.0C, expressed as a percentage of the rate at 0.2C. 0.2C corresponds to the current which discharges a charged cell within 5 hours. 1C, for example, is a current which is 5 times larger than the 0.2C current.

(c) Bulging: pouch cells are fully charged and inserted in an oven which is heated to 90° C. and stays at that temperature for several hours. At 90° C. the charged cathode reacts with electrolyte and creates gas. The evolved gas creates a bulging. In the Examples we report the values for the thickness increase (=bulging) measured after 4 hrs of high temperature exposure. Bulging is a relevant issue for many applications and moreover, the authors expect that bulging is a very sensitive method to detect eventual surface damage due to the water exposure during coating.

(d) Storage test, i.e. remaining and recovered capacity: cells are fully charged and stored for 1 month at 60° C. After 1 month the cell is removed from the 60° C. chamber and tested at 25° C. The cell is discharged, during discharge the remaining capacity is measured. After recharge the cell is discharged and the recovered capacity is obtained. After this capacity check the storage at 60° C. continues for another month, the remaining and recovered capacity is measured again, then the cell is stored for a third time, and is measured again. Additionally to the relevance for many applications, storage experiments are also a very sensitive tool to evaluate damage of the cathode during water-based coating.

(e) DCR resistance test coupled to storage test: additionally to the capacity measurements after 1, 2 and 3 months of storage at 60° C., the DCR resistance of the cell and the evolution over time of the DCR (expressed as % versus initial DCR) is measured. The DCR resistance is obtained from the voltage response to current pulses, the procedure used is according to USABC standard (United States Advanced Battery Consortium LLC). The DCR resistance is very relevant for practical application because data can be used to extrapolate fade rates into the future to prognoses battery live, moreover DCR resistance is very sensitive to detect damage to the electrodes, because reaction products of the reaction between electrolyte and anode or cathode precipitate as low conductive surface layers.

Figure 15:
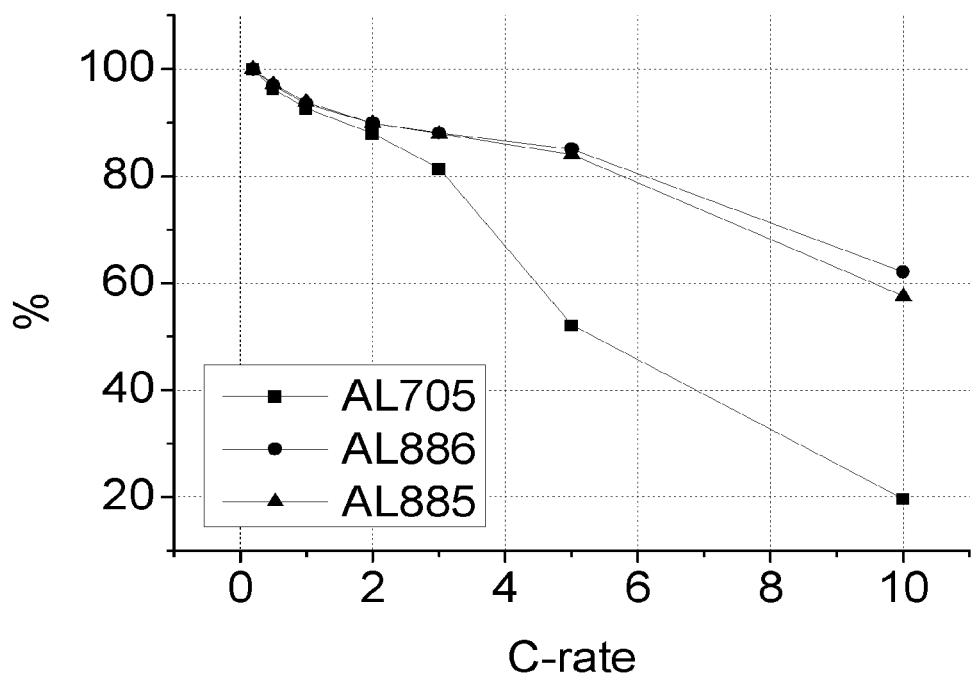
FIG. 15: Rate capability results of full cell test
Figure 16:
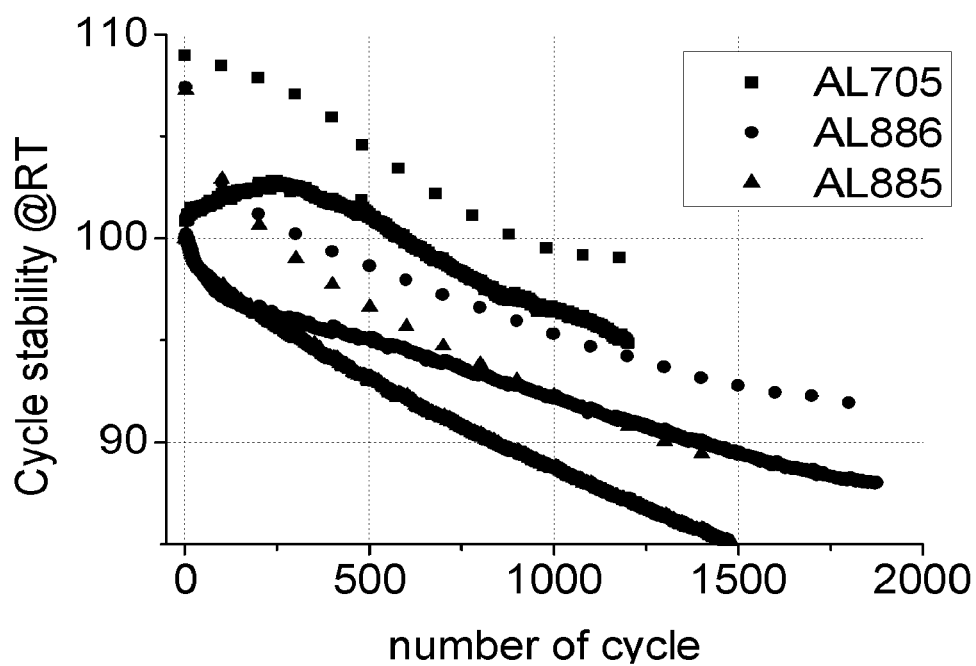
FIG. 16: Cycle stability at room temperature of full cell test
Figure 17:
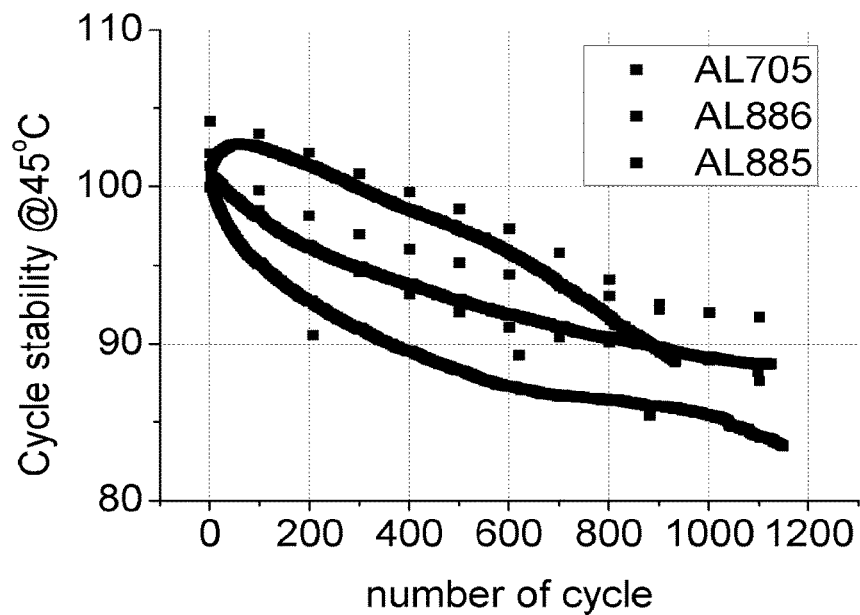
FIG. 17: Cycle stability at 45° C. of full cell test

Table 11 shows the capacity and rate capability results of the full cells. The rate capability (in % vs. C-rate) is also shown in FIG. 15. Table 12 shows the bulging test results and temperature properties of the full cell test. Table 13 shows the high temperature storage results of the full cell test (DCR and DCR increase test results). FIG. 16 shows the cycling stability results of the full cells at room temperature, where FIG. 17 shows these results at 45° C. Generally the lithium metal oxide product made from metal carbonate precursors has better electrochemical properties in full cells than the one made from metal hydroxide precursor: first of all, the lithium metal oxide product made from metal carbonate precursor has a higher discharge capacity and higher efficiency. Next these products have a lower DCR at low SOC and a higher rate capability. It should be noted that these electrochemical properties are an important parameter in electrical vehicle applications. When comparing the results for the impurity free LX0142 with that of LX0143 we observe, similar as in the coin cell test, a clearly better excellent cycle stability of the impurity containing sample LX0143. The authors attribute the improved cycle stability to the presence of a desired amount of sodium and sulfur impurities.

TABLE 11

| | | Capacity and rate capability of full cell test | | | | | | | | |
|---|---|---|---|---|---|---|---|---|---|---|
| | | Specific | | Rate capability | | | | | | |
| Battery ID | Sample ID | capacity mAh/g | Efficiency % | 0.2 C % | 0.5 C % | 1.0 C % | 2.0 C % | 3.0 C % | 5.0 C % | 10.0 C % |
| AL705 | LX0031 | 148.3 | 81.8 | 100.0 | 96.3 | 92.6 | 87.9 | 81.4 | 52.2 | 19.7 |
| AL886 | LX0143 | 151.4 | 84.8 | 100.0 | 96.9 | 93.5 | 89.9 | 88.0 | 85.0 | 62.1 |
| AL885 | LX0142 | 154.3 | 85.5 | 100.0 | 97.1 | 93.8 | 89.9 | 87.9 | 84.0 | 57.6 |

TABLE 12

Bulging test results and temperature properties of full cell test

| Battery ID | Sample ID | Manual bulging test (90° C., 4 hrs) Expansion ratio % | Temperature properties | | | | | |
|---|---|---|---|---|---|---|---|---|
| | | | −20 % | −10 % | 0 % | 25 % | 40 % | 60 % |
| AL705 | LX0031 | 39.7 | 61.9 | 73.1 | 82.3 | 100.0 | 106.0 | 109.2 |
| AL886 | LX0143 | 27.9 | 58.6 | 71.1 | 83.1 | 100.0 | 103.8 | 104.8 |
| AL885 | LX0142 | 28.7 | 58.4 | 71.1 | 82.9 | 100.0 | 103.4 | 104.2 |

TABLE 13

High temperature storage results of full cell test

| Battery ID | Sample ID | Initial DCR mΩ | High temperature storage | | | |
|---|---|---|---|---|---|---|
| | | | 0 M % | 1 M % | 2 M % | 3 M % |
| AL705 | LX0031 | 109.8 | 100.0 | 121.7 | 147.9 | 168.0 |
| AL886 | LX0143 | 111.4 | 100.0 | 117.9 | 139.4 | 161.7 |
| AL885 | LX0142 | 115.3 | 100.0 | 127.5 | 148.2 | 166.0 |

Example 10: Impurities in NMC from S and Na Containing $MCO_3$

Figure 18:
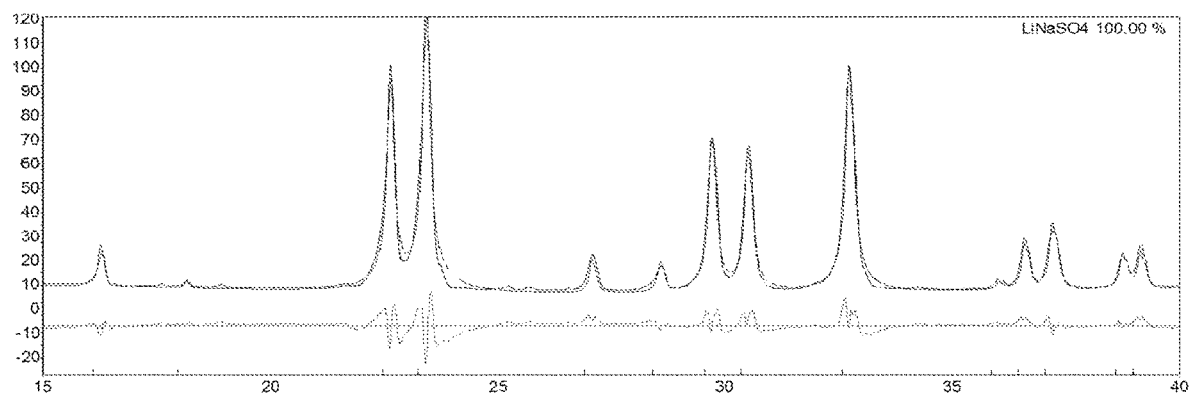
FIG. 18: XRD powder diffraction pattern and calculated pattern for LiNaSO$_4$

When a sodium and sulfur containing $MCO_3$ is used for preparing NMC cathodes most of the sodium and sulfur remains as an impurity in the final sample. If the sodium to sulfur impurity ratio is below 1 we expect that the sodium impurity is present as $Li_2SO_4$ and $LiNaSO_4$. If the sodium to sulfur impurity ratio is between 1 and 2 we expect that $Na_2SO_4$ and $LiNaSO_4$ coexist. $LiNaSO_4$ can be found in crystallographic databases under the ICSD number #3814. The main peak is at about $2\theta=23°$. To confirm this $LiNaSO_4$ was prepared by reacting $Na_2S_2O_8$ with $Li_2CO_3$ at 400° C. The reaction equation is $Li_2CO_3 + Na_2S_2O_8 \rightarrow 2\ LiNaSO_4 + CO_2 + \frac{1}{2} O_2$. Basically single phase $LiNaSO_4$ was obtained. FIG. 18 shows the XRD pattern together with a calculated pattern using the lattice constant and atomic positions for #3814 from the ICDS database. The main peak of the $LiNaSO_4$ phase is at 23.44° of 2θ. Other strong peaks are at 32.74° and 22.66°. Especially if the sodium to sulfur ratio is near to 1 (in this case the majority of the impurity phase is $LiNaSO_4$) the X-ray scattering of the impurity phase might be strong enough to be clearly detected by powder XRD. On the other hand—detecting the different peaks at 23.44, 32.74 and 22.66 degree is a strong evidence that the $LiNaSO_4$ phase is present.

Figure 19:
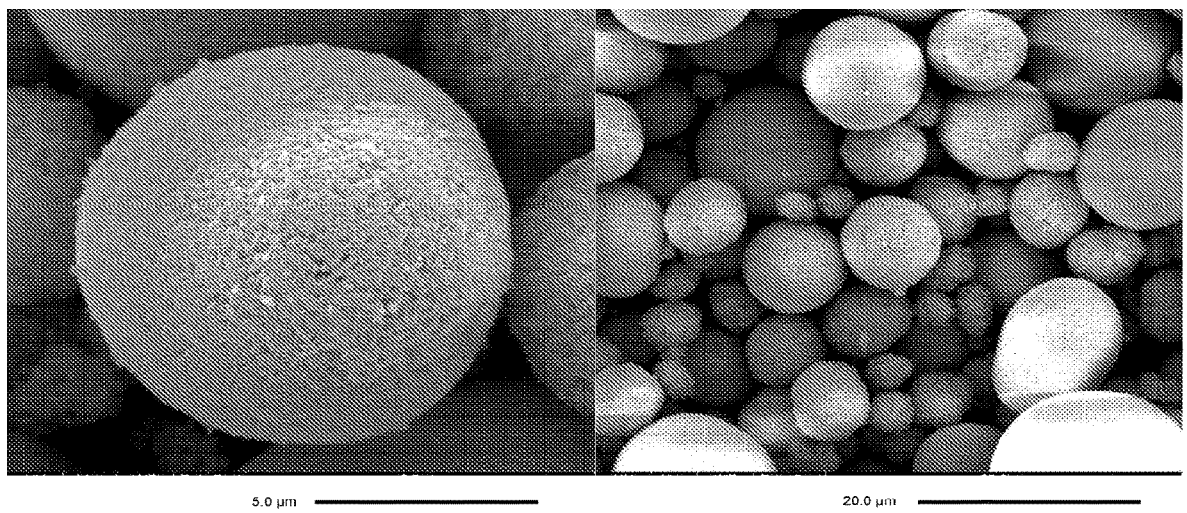
FIG. 19: SEM micrograph of NMC=261 sodium and sulfur containing precursor
Figure 20:
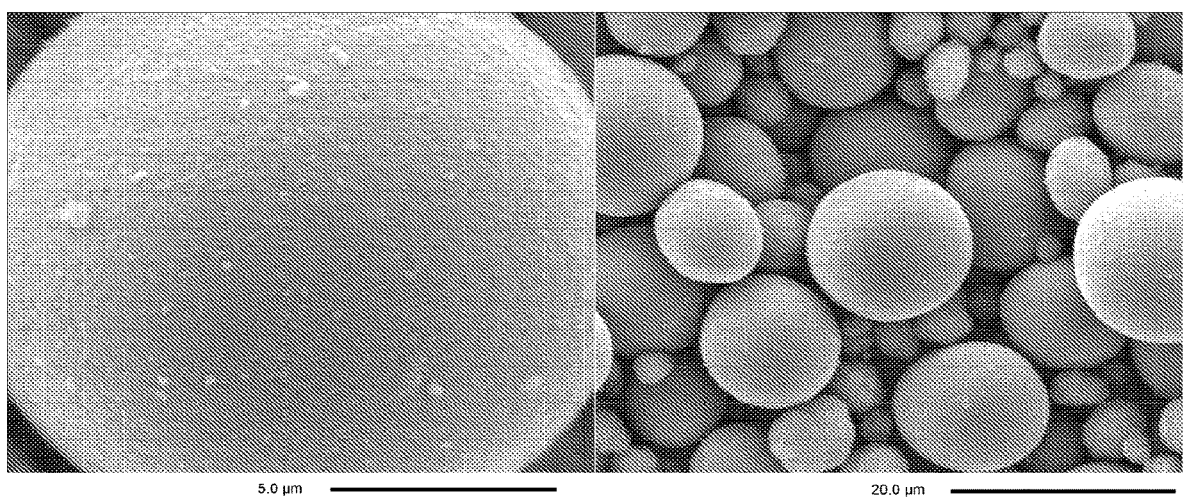
FIG. 20: SEM micrograph of NMC=261 sodium and sulfur containing final product (HLM330)

Example 11: Preparation of Li and Manganese Rich Cathode from Sodium and Sulfur Containing $MCO_3$ Precursor A pilot plant precursor with NMC=261 composition was obtained using the seeding technology, as explained in Examples 1 & 6. FIG. 19 shows a SEM micrograph of the precursor. The precursor contained 3216 ppm sodium and 5280 ppm sulfur (measured by ICP). The precursor was blended with $Li_2CO_3$. The Li:M blend ratio is 1.468. 1 kg was prepared. The blend is slowly heated to 800° C., then fired for 10 h. After cooling the product is sieved, resulting in sample HLM330. The morphology of the final product is shown in FIG. 20. The desired morphology has been achieved. Particles are spherical and relative dense but at the same time exhibit a significant porosity. The BET surface area is relatively large: 4.8 $m^2/g$, much larger than that of a dense powder of same shape, indicating the presence of an open meso-porous structure. After firing a total of 2 wt % impurities is expected, with 86% (17625 ppm) of the impurities present as $LiNaSO_4$, and 14% present as $Li_2SO_4$. Generally, if the sodium to sulfur ratio is near to unity we expect the highest contribution by LiNaSO4. The material had an excellent performance in coin cells (prepared as described in Example 8). When tested between 3.0-4.6V at room temperature (25° C.) using a current of 80 mA/g a reversible capacity of 291 mAh/g and an irreversible capacity of 5.4% is achieved. These are excellent results, which are significantly higher than any data ever achieved from similar material prepared from $M(OH)_2$. The cycle stability is satisfying: 16% fade per 100 cycles.

Figure 21:
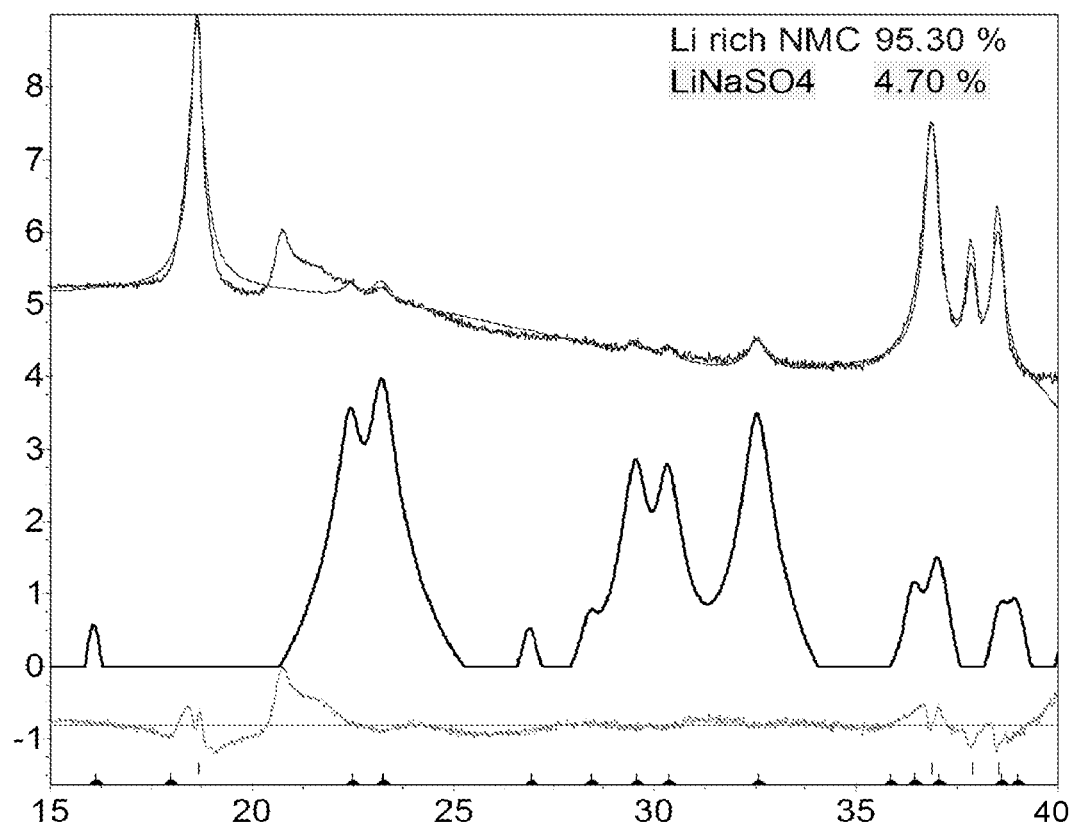
FIG. 21: XRD powder diffraction pattern of sample HLM330, with y-axis in logarithmic scale
Figure 22:
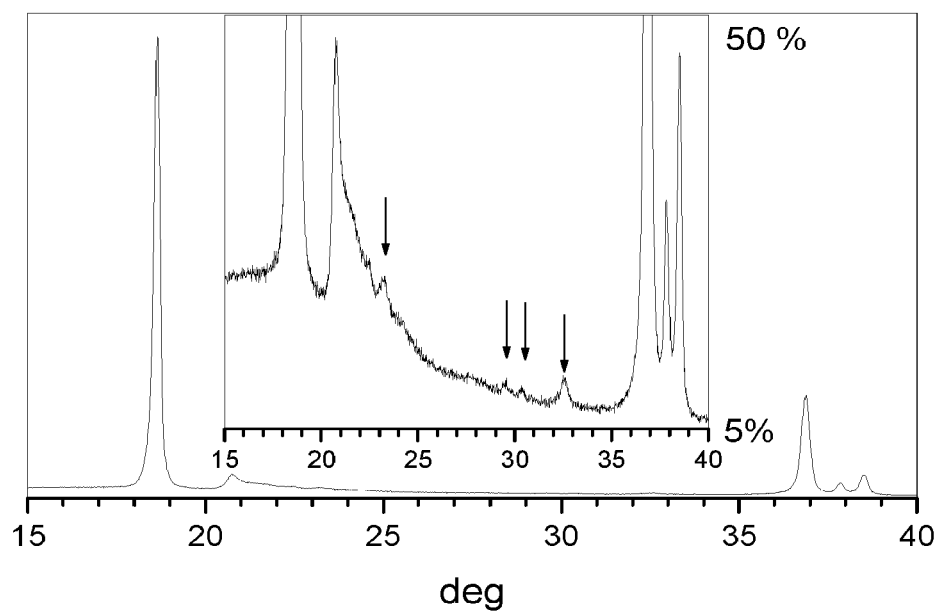
FIG. 22: XRD powder diffraction pattern of sample HLM330, with y-axis in linear scale

A careful slow XRD investigation is performed. In fact, a $LiNaSO_4$ phase can clearly be detected as secondary phase. The region from 15-40° is scanned for 4 h (0.1°/min) using a step-width of 0.02. FIGS. 21 and 22 shows the resulting XRD pattern (a.u. vs. degrees °). In FIG. 21 the y-axis is in logarithmic scale so that the impurity peaks are enhanced. Clearly peaks at 23.2, 29.54, 30.32 and 32.55° can be attributed to the XRD pattern. In FIG. 22 the y-axis is in linear scale. The exploded view enlarges the region from 0.5 to 5% of total intensity. Clearly peaks at 23.2, 29.54, 30.32 and 32.55° can be attributed to a $LiNaSO_4$ secondary phase.

Example 12: 532 NMC from S and Na Containing $MCO_3$

Figure 23:
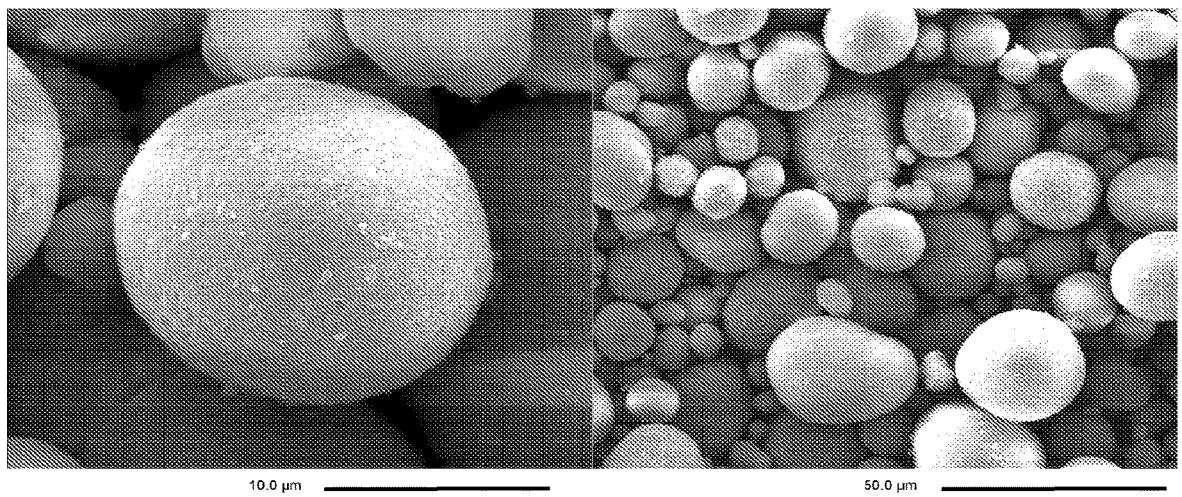
FIG. 23: SEM micrograph of precipitated sodium and sulfur containing NMC=532 metal carbonate

A $MCO_3$ precursor is prepared by a similar method as described in Example 1 with the exception that instead of NMC=552 a carbonate with NMC=532 composition is precipitated. Seeds are obtained from a ball milled $MCO_3$ obtained from a previous precipitation. The base/acid ($CO_3$/M) flow ratio is set at 1.03. The precipitated carbonate (sample MCO-0099ak) has a D50=16 μm. A nice spherical morphology with significant nano-porosity—with a BET=144 $m^2/g$—is observed. FIG. 23 shows the SEM of the precipitated carbonate. However, ICP showed that the sodium to sulfur impurity ratio was not within the desired region 0.4<Na/S<2. The impurity content is 5370 ppm Na and 2400 ppm sulfur. This results in a sodium to sulfur impurity ratio >3.

Figure 24:
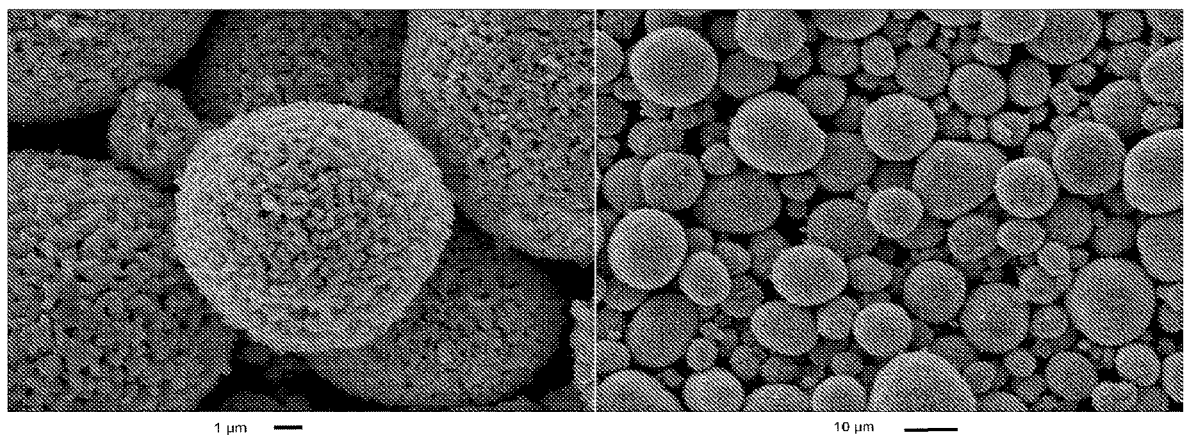
FIG. 24: SEM micrograph NMC EX1534
Figure 25:
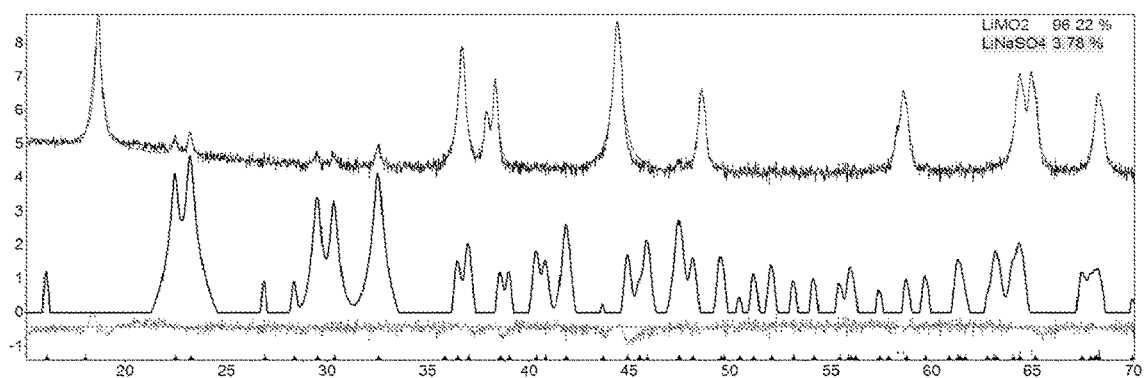
FIG. 25: XRD powder diffraction pattern of sample EX1534

The precursor MCO-0099ak was blended with $Li_2CO_3$ and fired. Several final samples were prepared with different Li:M ratios and different firing temperatures. Samples were tested by coin cell testing, as in Example 8. Despite the excellent morphology, high surface area and correct crystal structure (crystallite size and lattice constants) generally rather disappointing electrochemical properties are observed. Typical results are given for samples EX1518 and EX519. These samples have a similar performance as NMC 532 prepared from $M(OH)_2$ precursor. For the samples EX1518 and EX1519 the Li:M blend ratio is 1.02 and the sintering temperature 900° C. (EX1518) and 875° C. (EX1519), respectively. Table 14 summarizes the obtained results. The sample 60893 is a reference sample prepared from NMC 532 metal hydroxide. The reversible capacity is measured between 3.0-4.3V, at 16 mA/g and at 25° C. We assume that the too high Na and too low sulfur content is the cause of the poor performance. Therefore, additional $Li_2SO_4$ was added to the blend. In the presence of excess sulfur the undesired sodium will be removed from the crystal structure. A simplified reaction equation is $LiM_{1-x}Na_xO_2 + x\, Li_2SO_4 \rightarrow Li_{1+x}M_{1-x}O_2 + x\, LiNaSO_4$ The sample preparation was repeated. The $MCO_3$ precursor MCO-0099ak is blended with $Li_2CO_3$. The Li:M blend ratio is 1.02. Here however 2 mol % $Li_2SO_4$ per 1 transition metal are added to the blend. After adding the sulfate salt the sodium to sulfur impurity ratio in the blend is within the desired range 0.4-2.0. The blend is fired at 875° C. for 10 hours resulting in sample EX1534. FIG. 24 shows the SEM of the sample. FIG. 25 shows an X-ray powder diffraction pattern of sample EX1534. Scan conditions were 2 h scan, 0.02° step, 15-85°. Clearly a $LiNaSO_4$ secondary phase is present, since peaks are observed at 22.58, 23.22. 29.53, 30.39 and 32.53°. The y-axis is at logarithmic scale to enhance small peaks.

Coin cell testing shows that the electrochemical performance is significantly improved—see Table 14. Despite of adding electrochemical "inert" sulfate, the reversible capacity increased. This increase is caused by a dramatically decrease of irreversible capacity from about 11 to 8%.

In order to remove the Na and Sulfur impurity the remainder of sample EX1534 is washed with water to remove the soluble Li and Na sulfate salt. After filtering the sample is heat treated at 700° C. for 5 hours. The resulting sample EX1535 was tested in coin cells. Excellent capacity result are achieved. The irreversible capacity decreased further to 7% and the reversible capacity reached 176 mAh/g which is an exceptional high value for NMC 532. This very high value—compared to EX1534—is caused by (1) the very low irreversible capacity and (2) by the removal of electrochemically inert sulfate salt. Furthermore, the large BET surface area (2.14 m²/g) contributes to the large reversible capacity. The impurity free sample however shows worse cycle stability in full cells (data not shown).

TABLE 14

Performance of NMC 532

| Sample ID | Comment | BET m²/g | DQ1 (mAh/g) | IRRQ1 (%) |
|---|---|---|---|---|
| 60893 | M(OH)₂ reference | 0.302 | 168.7 | 11.50% |
| EX1518 | 900° C., Li:M = 1.02 | 0.618 | 167.9 | 11.55% |
| EX1519 | 875° C., Li:M = 1.02 | 0.918 | 167.5 | 10.62% |
| EX1534 | 875° C., 2% Li₂SO₄ | 0.555 | 169.6 | 8.02% |
| EX1535 | Washing EX1534 and reheating | 2.143 | 176.2 | 7.04% |

| Sample ID | Rate | | | Fade (%) | | |
|---|---|---|---|---|---|---|
| | 1 C | 2 C | 3 C | Q 0.1 C | Q 1 C | Q 1 C (H) |
| 60893 | 92.09% | 88.53% | 85.96% | 0.83 | 4.23 | 20.00 |
| EX1518 | 91.22% | 87.40% | 84.59% | 9.40 | 16.64 | 32.69 |
| EX1519 | 91.24% | 87.37% | 84.63% | 8.60 | 13.08 | 30.84 |
| EX1534 | 90.69% | 86.37% | 83.27% | 7.45 | 11.85 | 19.30 |
| EX1535 | 92.04% | 88.08% | 85.42% | 12.54 | 16.37 | 26.44 |

Example 13: 532 NMC from S and Na Containing MCO3

In Example 12 poor results were obtained for samples EX1518 and EX1519. To further investigate if this performance is caused by a too high sodium to sulfur impurity ratio a precursor with a lower ratio within the desired region is selected and the experiment is repeated.

The selected $MCO_3$ precursor was prepared by a similar method as described in Example 1:
1) the base to acid flow rate ratio (CO3/M) is adjusted to 1.00 to achieve a good balancing of sodium and sulfur impurities within the desired 0.4<Na/S<2 region.
2) No seeding is applied
3) Precipitation is performed for 6 hours, the sample is collected starting from hour 4

Figure 26:
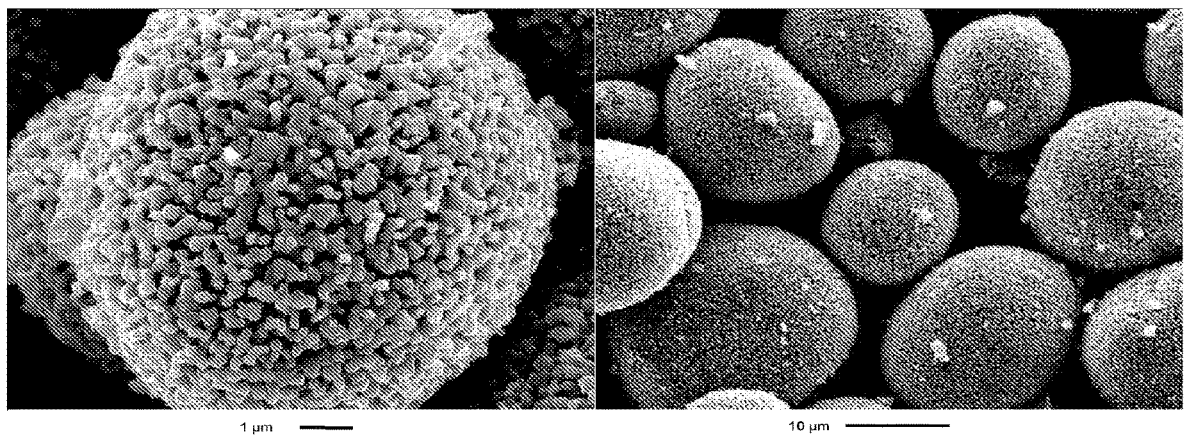
FIG. 26: FESEM micrograph of sample EX1577

The resulting sample MCO-0112a contains 2230 ppm sodium and 4190 ppm sulfur, with a sodium to sulfur impurity ratio of 0.74. The impurities are within the desired impurity region. The precursor is mixed with $Li_2CO_3$. The Li:M blend ratio is 1.02. The blend is fired at 875° C. for 10 hours in a flow of air, resulting in sample EX1577. Most of the Na and S impurities remain and an ICP analysis shows that the final NMC contains 2498 ppm Na and 4372 ppm sulfur. EX1577 has a high BET surface area of 2.12 m²/g, a preferred morphology with spherical, mesoporous particles, as is shown in FIG. 26 (SEM micrograph) and an excellent electrochemical performance. A very low irreversible capacity of 6.1% is achieved, the reversible capacity is 174.9 mAh/g (for the usual conditions: 3.0-4.3V, 16 mA/g, 25° C.)

Sample EX1518 and EX1519 from Example 12 have a comparable morphology, also details of the crystal structure (lattice volume, crystallinity) are very similar. However, compared to EX1577 a poor electrochemical performance is observed. The authors believe that the main reason for the poor performance of EX1518 and EX1519 is the high sodium to sulfur impurity ratio in the carbonate precursor which exceeds the desired 0.4<(Na/S)<2 region. Contrary to this, sample 1577 is prepared from a precursor which is well within the preferred region.

Example 14: 111 NMC from S and Na Containing MCO₃

A sodium and sulfur containing carbonate precursor with NMC=111 composition is prepared as described in Example 1. The base/acid flow ratio (CO₃/M) is chosen as 1.0 to achieve a sodium to sulfur impurity ratio within the desired region 0.4<Na/S<2. The resulting sample MCO-0114g contains 2890 ppm sodium and 3660 ppm sulfur, hence the sodium to sulfur impurity ratio is 1.1. The precursor is mixed with $Li_2CO_3$. The Li:M blend ratio is 1.1. The blend is fired at 850° C. for 10 hours in a flow of air, resulting in sample MX0809.

Figure 27:
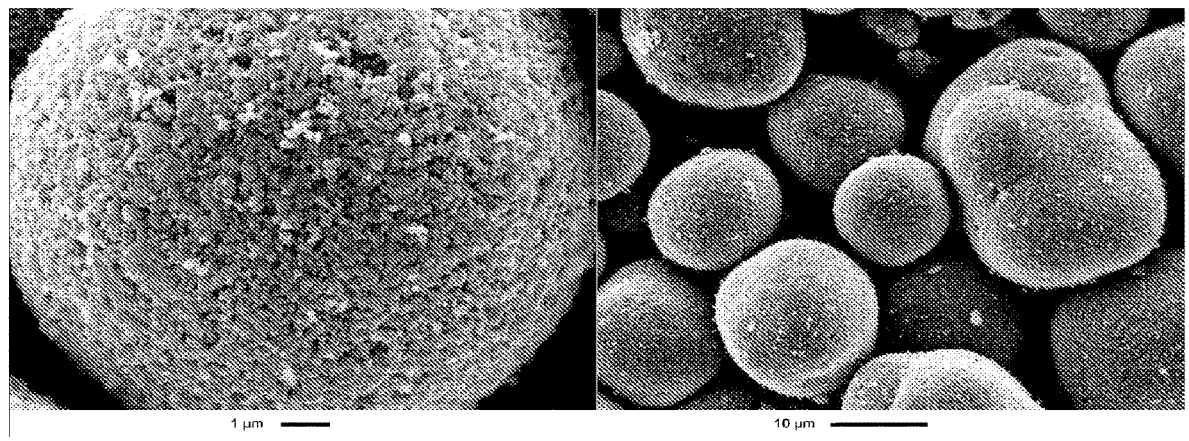
FIG. 27: FESEM micrograph of sample MX0809

MX0809 has a high BET surface area, a preferred morphology with spherical, mesoporous particles (see FIG. 27 for a SEM micrograph) and an excellent electrochemical performance. A very low irreversible capacity of 4.4% is achieved, the reversible capacity is 161.3 mAh/g (for the usual conditions: 3.0-4.3V, 16 mA/g, 25° C.). A typical mass production reference prepared from dense M(OH)₂ has an irreversible capacity >10%, and the reversible capacity is about 155 mAh/g. The authors attribute the excellent electrochemical performance to (a) the open mesoporosity originating from the use of a $MCO_3$ based precursor, and (b) the $MCO_3$ precursor having sodium and sulfur impurities within the preferred impurity ratio Example 15: Precipitation of Na and Sulfur Containing Carbonate Using Dry Power Feeding The previous Examples have shown that NMC with excellent electrochemical performance can be achieved from sulfur and sodium containing carbonate precursor. However, compared to a typical M(OH)₂ precipitation at mass production a $MCO_3$ precipitation has a major drawback in its less volumetric efficiency. The major reason is the much lower solubility of $Na_2CO_3$ compared to NaOH. In a typical $M(OH)_2$ precipitation feeds could be (1) 10 M NaOH, (2) 2M $MSO_4$ and (3) 10M $NH_4OH$. The precipitation is according the (simplified) formula:

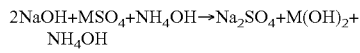

This shows that to precipitate 1 mol of $M(OH)_2$, 200 ml NaOH, 500 ml $MSO_4$ and 100 ml $NH_4OH$ are needed. This adds up to 800 ml solution per 1 mol precipitated transition metal hydroxide. Assuming NMC=532, then 1 mol of transition metal hydroxide $M(OH)_2$ corresponds to 91.6 gram. For a typical $MCO_3$ precipitation feeds could be (1) 2M $Na_2CO_3$ and (2) 2M $MSO_4$, where both flows have a concentration not far from the solubility limit. The precipitation is according the (simplified) formula: $Na_2CO_3 + MSO_4 \rightarrow MCO_3 + Na_2SO_4$ This shows that to precipitate 1 mol MCO, 500 ml of $Na_2CO_3$ and 500 ml of $MSO_4$ are needed. This adds up to 1 L per 1 mol precipitated $MCO_3$. Assuming NMC=532, then 1 mol of precipitated metal carbonate $MCO_3$ corresponds to 117.6 gram. From a point of view of efficiency, the carbonate precipitation has to handle larger volumes (+25%) of liquid waste. Also the handling of solids (filtering, drying etc.) tends to cause a cost that is proportional to the volume or mass of the precipitate. Because the transition metal content is less in $MCO_3$ compared to $M(OH)_2$, i.e. 49% versus 62%, solid handling tends to be less efficient for the carbonate precipitation. Finally, whereas NaOH is available as a liquid at competitive cost, $Na_2CO_3$ is purchased as a powder and needs facilities to dissolve on-site.

For all these reasons, the $MCO_3$ precipitation is potentially less efficient and there is a strong need to increase the efficiency of the carbonate precipitation to achieve—cost wise—a truly competitive process. This Example suggests a precipitation route where basically continuously a flow of $MSO_4$ and, simultaneously, $Na_2CO_3$ powder are fed to a stirred reactor. The solid feeding can be done by gravimetric controlled screw feeders. This approach reduces liquid waste from 1 L by 50% to 500 ml per mol precipitated $MCO_3$. As for the experiment in the lab a gravimetrically controlled screw feeder was not available, a fixed amount of $Na_2CO_3$ powder was added each 10 minutes, whereas $MSO_4$ was fed continuously. Besides the replacement of the $Na_2CO_3$ flow by powder, the experiment is similar as described in Example 1. The metal composition is NMC 552. The $MSO_4$ flow rate is increased to achieve about the same residence time of 2.5 hours. The base to acid ratio ($CO_3$/M) is over time fixed at 1.03. The precipitation achieved a $MCO_3$ having a sodium to sulfur impurity ratio within the preferred region 0.4<Na/S<2. The precipitated $MCO_3$ contains 2649 ppm Na and 8086 ppm sulfur (Na/S=0.45).

Figure 28:
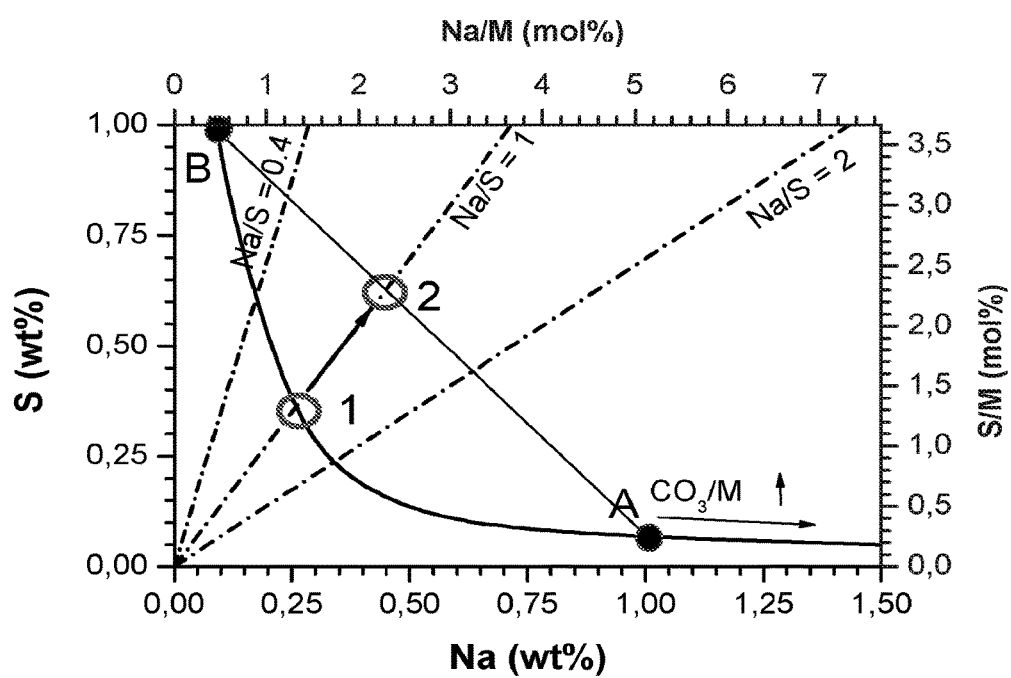
FIG. 28: Schematic model related to dry powder feeding

The total impurity concentration is higher than expected for a liquid precipitation. The authors believe that the higher impurity level is caused by poor process control. A better process delivering a lower impurity can be achieved by accurate and continuous feeding of the $Na_2CO_3$ powder. Compared to normal precipitation the precipitated carbonate was less dense and more fluffy. A better process control should significantly improve these issues as well. FIG. 28 explains schematically why the non-continuous sold feeding can cause a higher total impurity, and why a more continuous process will solve this issue. The line B-1-A is the line of impurities obtained for a "normal" precipitation applying constant flow rates (see Examples 1-3). As $CO_3$/M increases Na increases and sulfur decreases, but the line is not a straight line.

Point (1) displays the impurities obtained after a normal precipitation, for example at a flow rate ratio ($CO_3$/M) of 1.0.

After adding $Na_2CO_3$ powder the $CO_3$/M ratio temporarily is high and $MCO_3$ with high Na impurity (point "A") precipitates. As $Na_2CO_3$ is consumed (no $Na_2CO_3$ added for some time but continuously $MSO_4$ solution injected) the $CO_3$/M ratio in the solution decreases. At point "B", sulfur rich $MCO_3$ precipitates. The final $MCO_3$ product will be a mixture of $MCO_3$ with different impurity ratios. However, a mixture of carbonate "A" and "B" is point 2. Point 2 has a higher total impurity content than the reference hydroxide precipitated at point "1". The authors expect that—as $Na_2CO_3$ powder addition become continuous—point "A" and "B" both move towards point "1" and a better $MCO_3$ product can be achieved.

The invention claimed is:

1. A carbonate precursor compound for manufacturing a lithium metal (M)-oxide powder usable as an active positive electrode material in lithium-ion batteries, M comprising 20 to 90 mol % Ni, 10 to 70 mol % Mn and 10 to 40 mol % Co, the precursor further comprising a sodium and sulfur impurity, wherein the sodium to sulfur molar ratio (Na/S) is 0.4<Na/S<2, and wherein the sum $(2*Na_{wt})+S_{wt}$ of the sodium ($Na_{wt}$) and sulfur ($S_{wt}$) content expressed in wt % is more than 0.4 wt % and less than 1.6 wt %, wherein the sodium content is between 0.1 and 0.7 wt %, and the sulfur content is between 0.2 and 0.9 wt %.

2. The carbonate precursor compound of claim 1, having the general formula $MCO_3$, wherein M=$Ni_xMn_yCo_zA_v$, A being a dopant, wherein 0.20<x<0.90, 0.10<y<0.67, and 0.10<z<0.40, v<0.05, and x+y+z+v=1.

3. The carbonate precursor compound of claim 2, wherein A is selected from the group consisting of Mg, Al, Ti, Zr, Ca, Ce, Cr, Nb, Sn, Zn and B.

4. A method for preparing a carbonate precursor compound according to claim 1, comprising:
   providing a feed solution comprising Ni-, Mn- and Co-ions, and a source of A, wherein the Ni-, Mn-, Co-and A-ions are present in a water soluble sulfate compound,
   providing an ionic solution comprising a carbonate solution and Na-ions, wherein the $CO_3$/$SO_4$ rate is selected so as to obtain a Na/S molar ratio with 0.4<Na/S<2 and the sodium ($Na_{wt}$) and sulfur ($S_{wt}$) content expressed in wt % yield a sum $(2*Na_{wt})+S_{wt}$ of more than 0.4 wt % and less than 1.6 wt %,
   providing a slurry comprising seeds comprising M'-ions, wherein M'=$Ni_{x'}Mn_{y'}Co_{z'}A'_{n'}$,
   A' being a dopant, with 0<x'<1, 0<y'<1, 0<z'<1, 0<n'<1 and x'+y'+z'+n'=1,
   mixing the feed solution, the ionic solution and the slurry in the reactor, thereby obtaining a reactive liquid mixture,
   precipitating a carbonate onto the seeds in the reactive liquid mixture, thereby obtaining a reacted liquid mixture and the carbonate precursor, and
   separating the carbonate precursor from the reacted liquid mixture.

5. The method according to claim 4, wherein the M'-ions are present in a water insoluble compound that is selected from the group consisting of M'$CO_3$, M'$(OH)_2$, M'-oxide and M'OOH.

6. The method according to claim 4, wherein the molar ratio ($M'_{seeds}/M_{feed}$) of the metal content in the seed slurry to the metal content in the feed solution is between 0.001 and 0.1, and wherein the median particle size of the carbonate precursor is determined by the ratio $M'_{seeds}/M_{feed}$.

7. The method according to claim 4, wherein A and A' are selected from the group consisting of Mg, Al, Ti, Zr, Ca, Ce, Cr, Nb, Sn, Zn and B.

8. The method according to claim 4, wherein the concentration of $NH_3$ in the reactor is less than 5.0 g/L.

9. The method according to claim 4, wherein M=M'.

10. The method according to claim 4, wherein the ionic solution further comprises either one or both of a hydroxide and a bicarbonate solution, and the ratio $OH/CO_3$, or $OH/HCO_3$, or both these ratios are less than 1/10.

11. The method according to claim 4, wherein the seeds have a median particle size D50 between 0.1 and 3 μm.

12. A method for preparing the carbonate precursor compound of claim 2, comprising:
   providing a feed solution comprising Ni-, Mn- and Co-ions, and a source of A, wherein the Ni-, Mn-, Co- and A-ions are present in a water soluble sulfate compound,
   providing an ionic solution comprising a carbonate solution and Na-ions, wherein the $CO_3/SO_4$ rate is selected so as to obtain a Na/S molar ratio with 0.4<Na/S<2 and the sodium ($Na_{wt}$) and sulfur ($S_{wt}$) content expressed in wt % yield a sum ($2*Na_{wt}$)+$S_{wt}$ of more than 0.4 wt % and less than 1.6 wt %,
   providing a slurry comprising seeds comprising M'-ions, wherein $M'=Ni_{x'}Mn_{y'}Co_{z'}A'_{n'}$,
   A' being a dopant, with 0<x'<1, 0<y'<1, 0<z'<1, 0<n'<1 and x'+y'+z'+n'=1,
   mixing the feed solution, the ionic solution and the slurry in the reactor, thereby obtaining a reactive liquid mixture,
   precipitating a carbonate onto the seeds in the reactive liquid mixture, thereby obtaining a reacted liquid mixture and the carbonate precursor, and
   separating the carbonate precursor from the reacted liquid mixture.

13. A carbonate precursor compound for manufacturing a lithium metal (M)-oxide powder usable as an active positive electrode material in lithium-ion batteries, having the general formula $MCO_3$, wherein $M=Ni_xMn_yCo_zA_v$, A being a dopant, wherein 0.10<x<0.30, 0.55<y<0.80, and 0<z<0.30, v<0.05, and x+y+z+v=1, the precursor further comprising a sodium and sulfur impurity, wherein the sodium to sulfur molar ratio (Na/S) is 0.4<Na/S<2.

* * * * *